(12) United States Patent
Kettler et al.

(10) Patent No.: US 7,376,680 B1
(45) Date of Patent: May 20, 2008

(54) SYSTEM AND METHOD FOR CLEANSING, LINKING AND APPENDING DATA RECORDS OF A DATABASE

(76) Inventors: Charles Loren Kettler, HC 69 Box 1335, White Sulphur Springs, WV (US) 24986; John A. McDill, 2504 Atrium Ct., Bowie, MD (US) 20716

( * ) Notice: Subject to any disclaimer, the term of this patent is extended or adjusted under 35 U.S.C. 154(b) by 499 days.

(21) Appl. No.: 10/820,375

(22) Filed: Apr. 7, 2004

Related U.S. Application Data

(60) Provisional application No. 60/461,272, filed on Apr. 7, 2003.

(51) Int. Cl.
 *G06F 17/30* (2006.01)
(52) U.S. Cl. .................. 707/205; 707/202; 707/203; 707/204
(58) Field of Classification Search ............. 707/1–10, 707/100–104.1, 200–206
 See application file for complete search history.

(56) References Cited

OTHER PUBLICATIONS

National Customer Support Center, "Coding Accuracy Support System (CASS) Technical Guide", National Customer Support Center, US Postal Service, Jan. 2004, 129 pages.
Address Support Systems Department, "Address Matching Guidelines", National Address Information Center, US Postal Service, Jul. 1992, 35 pages.
Database America Information Systems, Inc., "A User's Guide to DSF (Delivery Sequence File) Processing at Database America",Database America Companies, Jan. 1996, 31 pages.
Database America Information Systems, Inc., "User's Guide for NCOA Processing and NCOA Nixie Processing", Database America Companies, Jun. 1995, 21 pages.
Donnelley Marketing, "InfoConnect ONEPASS", http://www.donnelleymarketing.com/prodserv/EnrichmentServices.htm, Donnelley Marketing, Apr. 5, 2004, 2 pages.
Donnelley Marketing, "Donnelley's MasterMatch®", http://www.donnelleymarketing.com/prodserv/MasterMatch.htm, Donnelley Marketing, Apr. 5, 2004, 3 pages.
Donnelley Marketing, "File Hygiene", http://www.donnelleymarketing.com/service/donnelley/file_hygenine.aspx?bas_vendor=99818, Donnelley Marketing, Nov. 2, 2006, 2 pages.
Donnelley Marketing, "Merge/Purge", http://www.donnelleymarketing.com/service/donnelley/merge_purge.aspx?bas_vendor=99818, Donnelley Marketing, Nov. 2, 2006, 1 page.
Group 1 Software, Inc., "Consumer Merge/Purge®", 1990, 43 pages.
Viewcentral, Inc., "Group 1 University", https://inter.viewcentral.com/events/cust/catalog.aspx?cid=G1&pid=1, Nov. 2, 2006, 21 pages.

(Continued)

*Primary Examiner*—Isaac Woo
(74) *Attorney, Agent, or Firm*—Thompson Hine LLP

(57) ABSTRACT

A system and method for reading a data record from an input file only once, processing that data record according to one or more reference files, and then writing out the cleansed and updated data record to a target file such that the data record is read and written to remote storage only once, thereby making a single pass through a given database of data records. Each data record (comprising of multiple data elements) of the input file is reviewed, verified, and corrected against one or more reference databases containing similar information, assigned a unique identifying key, and, optionally, appended with new additional data elements of a matching data record from a new-data database.

19 Claims, 11 Drawing Sheets

OTHER PUBLICATIONS

Group 1 Software, Inc., "Overview SearchMaster", Nadis Family of Products, Undated, 22 pages.

Group 1 Software, Inc., "Code-1 Plus", Product Overview, 1991-1994, 52 pages.

Grossman & Stevens, "Our Data is a Mess! How to Clean Up Your Marketing Database", Business to Business Database Marketing, Oct. 2005, 9 pages.

Pinder & Chong, "Record Linkage for Registries: Current Approaches and Innovation Applications", North American Association of Central Cancer Registries, Jun. 9, 2002, 47 pages.

Vality Technology Inc., "Enterprise Intelligence—Enabling High Quality in the Data Warehouse/DSS Environment", Product Brochure, Vality Technology Inc., Undated, 15 pages.

Vality Technology Inc., "Customer, Relationships and Households Derived from Account-Oriented Data", Product Brochure, Vality Technology Inc., Undated, 12 pages.

Vality Technology Inc., "The Cost Justification for Data Re-engineering", Product Brochure, Vality Technology Inc., Undated, 10 pages.

Vality Technology Inc., "Introduction to Integrity—Resolving Parts Description", Product Brochure, Vality Technology Inc., Undated, 8 pages.

Vality Technology Inc., "Five Legacy Data Contaminants That You Will Encounter In Your Data Migrations", Product Brochure, Vality Technology Inc., Undated, 8 pages.

Vality Technology Inc., "Five Common Excuses for Not Re-engineering Legacy Data", Product Brochure, Vality Technology Inc., Undated, 6 pages.

Winkler, "Record Linkage Software and Methods for Merging Administrative Lists", Bureau of the Census, Statistical Research Division, Jul. 23, 2001, 11 pages.

SYSTEM AND METHOD FOR CLEANSING, LINKING AND APPENDING DATA RECORDS OF A DATABASE

CROSS-REFERENCE TO RELATED APPLICATIONS

This application claims the benefit of U.S. Provisional Application No. 60/461,272 filed on Apr. 7, 2003.

BACKGROUND OF THE INVENTION

1. Field of the Invention

This invention relates to computer software and database record matching, and more specifically, to systems for using multiple reference files in cleansing, linking, and appending data elements of input records from a database to improve deliverability of the database, matching of data elements, and appending new data elements to the database.

2. Related Art

There are numerous businesses and governmental agencies that require current, up-to-date information on persons located throughout the country, and perhaps even the world. Most notably, mail carriers such as the United States Postal Service (USPS), as well as, Federal Express and United Parcel Service, require current name and address information on persons in order to efficiently deliver mail. In addition, publishers and other media service providers, such as television and satellite broadcasters, internet service providers, and the like, require the same up-to-date contact information for their customers. Due to the vast number of entries needed to make such a database useful, it is common to expect such a database to contain millions of data records, and as many as hundreds of millions or even a billion data records.

Also, due to the competitive nature of these industries, many of the service providers require additional information contained in one or more reference files to be appended to each person's data record in the main, input database. For example, additional information may include, but not be limited to, demographic information, purchasing history, name change information, and the like. Thus, there is a need for a computer software system that efficiently manages a large input database and is capable of quickly and accurately updating data records in the input database, including the cleansing of existing data in the data records of the database and appending new data to the data records of the large database according to matching data records in one or more reference files. Thus, based on the large size needed for such an input database, a system is needed that can process (either by cleansing or appending new data) about one million to about ten million data records per hour in order to make the input database and the accompanying software system usable to a service provider. In addition, a system is needed for efficiently processing individual data records of a database wherein the time for processing a single data record is important.

Today, conventional software systems directed to handling large input databases of this type perform only one operation at a time. For example, if an input database containing contact information for different persons requires each data record to be postal coded, processed with any USPS National Change of Address request, and appended with the corresponding telephone number, conventional software systems perform one operation at a time. This results in each data record being read from the input file and written to an output file three different times—one for each required action or process. Considering the fact that the input and output files are typically stored on remote storage devices, due to the vast size of such files, the extra reads and writes are exceedingly costly in both time and computer processor resources.

Therefore, there is a need for a system and method for recycling a data record of an input file back through processes that the data record has already been through when a later process changes a value of a data element in the data record. This concept of recycling each data record back through all of the prior processes before moving to the next step has not generally occurred in any conventional systems. Conventional systems that do attempt to perform similar recycling functions therefore require significantly increased set up time, machine resources, and elapsed time, if or when requested by the client.

For example, in the case of a Change of Address Process (COA), the COA reference file may not chain moves that have been made in one case as an individual and in another case as a family. This means if a data record in an input file was modified by a matching record in a COA reference file with a new address, that same data record may still have a more recent address change in a second COA reference file. It has been the general practice in the industry to separate the records related to a new address by a COA reference file, then process these records back through all of the matching records in the COA reference file, and then merge the data records back into the original input file. This procedure is time consuming, error prone and costly. This same problem is encountered with any single process or combination of processes when reprocessing of changed records is desired.

The industry typically uses some form of a weights and penalty matcher, sometimes with some limited additional logic, such as requiring an exact match on house number or unit number. The result is a number of matching errors of either under-match or overmatch. A large part of the cause of this error problem is that this conventional approach reduces the match decision to a greater than or less than comparison with a scalar value. If every parsed element of the name and address and other identifying information to the extent available, such as parts or all of SSN, Phone Number, DOB, etc., were graded as being a match or not a match, then the decision becomes whether the candidate match is on one side or the other of a decision surface in an N+1 dimensional space, with N−1 more degrees of freedom in the decision making process.

U.S. Pat. No. 6,658,430 to Harman discloses a method and system for reformatting a text file such that a resulting output file can be easily manipulated, enhanced and postal coded. Although the Harman system provides a new method for reformatting an ASCII or similar text file, it is readily apparent the Harman system does not address the process of cleansing the data records of an input file and improving the efficiency of such cleansing by reducing the number of reads and write to remote storage or recycling a record that has changed information.

In addition to the above-discussed systems, there is no prior art software system currently available that processes a data record of an input file in one pass of each client record through multiple processes in any of the referenced patents, articles, sales materials, or world wide web pages. The industry norm today is to process the data records of an input file, such as a client file, against multiple reference files by processing all of the data records of the input file against one reference file at a time, resulting in two accesses of remote storage for each data record of the input file for each reference file. That is, each data record of the input file is read from remote storage, e.g., disk, processed against one reference file only, and then written back out to remote storage. This procedure is then repeated for the next reference file. As a result, such prior art systems are extremely set-up labor intensive and take an exorbitant amount of wall clock time. Although several companies have developed and implemented graphical front ends for these prior art systems to facilitate the job setup of such multifunction jobs, such graphical front ends do not address the multiple reads and writes to remote storage required for each data record of an input file for the number of reference files, nor do such prior art systems provide a means for recycling data records.

SUMMARY OF THE INVENTION

The present invention solves the problems in the prior art systems by providing a system and method for reading a data record from an input file, e.g., an input database, only once, processing that data record according to one or more reference files, and then writing out the results to a database in a target file, e.g., a cleansed output file, such that the data record is read and written to remote storage only once. Thus, the present invention is a system and method for making a single pass through a given database of data records, wherein each data record (comprising of multiple data elements) is reviewed, verified, and corrected against one or more reference databases containing similar information, assigned a unique identifying key, and, optionally, appended with additional data elements of a matching data record from a new-data database. Now when you take into account that a data record can benefit from being recycled back through processes that it has already been through when a later process changes a data field in the data record, the concept of processing each data record back through all the prior processes before moving to the next step takes on added significance.

Thus, the present invention is targeted for any business having a need for a complete database of records stored in an output file, wherein the complete database is generated from a baseline database, e.g., an input file, that is verified and corrected using databases contained in one or more reference files. In addition, new data from the reference files may be appended to the data records being processed thereby expanding the original database. Each data record in the resulting database, stored in the output file, also is given a unique identifier for easy search and retrieval.

The preferred embodiment of the present invention is a complete database having contact and identification information on both persons and businesses, e.g., name, address, telephone number(s), social security number, date-of-birth, etc., as well as, application specific information contained in a new-data database, e.g., marketing demographics, account information, tax information, consumer information, etc. Current applications of the present invention include using the disclosed process and method for data records used by the Internal Revenue Service (IRS), insurance companies (e.g., Globe Insurance), delivery carriers (e.g., Federal Express), document management services (e.g., Lexis Nexis), communication services (e.g., Time Warner), database management services (e.g., Merkle Direct), business computer integration solution services (e.g., LCS Client Logic), and by any public service provider for assisting in the starting, growing, and operating of businesses (e.g., Masada). The present invention is described in these terms for convenience purpose only. It would be readily apparent to one of ordinary skill in the relevant art to use the method of the present invention for other extremely large databases.

In addition, the present invention is described in terms of reference files directed to changing or validating changes in address. Examples of conventional and available systems, and thus resulting reference files, that change a data record's address are: Postal Coding, National Change of Address (NCOA), Locatable Address Conversion System (LACS), Proprietary Change of Address (PCOA), and Name & Address Completion, Correction & Verification (CCV). In addition, the reverse appending of a person's name and address onto a data record containing only a person's telephone number, e-mail address, and other limited, identifying keys, also clearly can complete or correct an incomplete or incorrect name and/or address data field of a data record. For example, the CCV system may also change the name of a person in a data record of an input file. It is also anticipated that soon the USPS, NCOA Link, LACS Link and other USPS Link products will produce reference files that can be used to change either the name or address or descriptive data or other identifying keys of a data record of an input file. Therefore, in each of these cases there is a clear benefit to recycling the record as in the present invention.

Furthermore, personal or business name and address hygiene and associated data overlay or append services (here defined as "cleansing") are most frequently used in direct marketing efforts, maintaining customer and prospect files in internal operational systems, database marketing systems or customer relationship management (CRM) systems, locating persons, or in medical, transportation, demographic, etc. research. Thus, there are many other lesser applications of linking (or matching) with and without name and address variables as the data items used in the linking operation described herein.

Thus, the present invention comprises a software driver and associated processing modules, typically involving matching of the data records of an input file to the data records of one or more reference files. The reference files may be optionally accessed by the system in any sequence in order to optimize a specific feature, e.g., accuracy rating, cost, and the like. Also, the system may recycle a data record through previously accessed reference files if changes are made in the data record that result in a change from the first time processed through each reference file. A key factor of the present invention is that the data record from the input file being processed remains in random access memory until all processing on that data record against all of the reference files is completed. This local storage of the data record while it is being processed saves many reads and writes from and to remote storage over conventional practice. In addition, logic may be used at a subsequent processing option to determine whether or not a specific reference file will be accessed during the processing of a data record. If no match, or no good match is made, then one or more alternate search keys may be used to attempt a match. This is especially useful to correct and complete data elements of the name and the address even when all the data elements of the last line are incorrect or missing (City, State and ZIP Code).

A weights and penalty matcher of conventional systems has the disadvantage that the decision as to whether there is a match is reduced to a single scalar value where, for example, a value at or above a specified threshold is considered a match and a value below that specified value is considered a no match. In contrast, a matcher of the present invention has a vector of degrees of matching (or linking) with one element of the vector for each of the data items in the two data records being compared for matching. This approach provides for a much-refined definition of a match or no-match and much lower under and over match errors.

It also allows for the user to decide that specific types of similar records near the match/no-match decision surface may be considered either a match or no-match to meet specific client requirements.

Because the typical reference file in the intended application of the present system contains about 100 million data records to 1 billion data records, and the input file is typically a few tens of thousand data records to a few 100 million data records, performance is a major issue. Performance must be good for both sparse and dense populations of input files. Accordingly, the present invention provides various options to improve performance in both sparse and dense populations of input files, and these options are: (1) use a single reference file compiled from multiple reference files, wherein all duplicate entries regarding name and address information have been removed, i.e., the single reference file has been deduplicated, or (2) use concatenated reference files that are not deduplicated, or (3) use separate reference files for each of the NON-USPS processing options. Options (2) and (3) allow prompt use of new data updates, while such new files are merged into a single reference file.

The processing options of the data records of an input file of the present invention include, by way of example, one or more, or all or similar concepts, in the following, including many industry standard functions:

a. File Convert and Field Reformat
   b. Name and Address Standardization
   c. Postal Coding (ZIP, ZIP+4, Delivery Point Code and Carrier Route Code)
   d. U.S. Census Geographic Coding (Block, Block Group, Tract, County, State, etc.)
   e. USPS Delivery Point Verification (DPV)
   f. USPS Delivery Sequence File Second Generation ($DSF^2$)
   g. USPS National Change of Address Linkage System (NCOALink)
   h. USPS Locatable Address Conversion Linkage System (LACSLink)
   i. Name & Address Completion, Correction & Verification (CCV)
   j. Proprietary Change of Address (PCOA)
   k. Name at an Address Confirmation (NAC)
   l. Deceased Flagging (DF)
   m. Overlay (OVLY)
   n. Append (APPD)
   o. Audit
   p. Generate Front Door Key
   q. Generate Personal Key Therefore, it is an object of the present invention to provide a method for obtaining in one pass of a database file, e.g., a client name and address file, all of the benefits of processes successively passed one at a time. This one pass through the database input file provides the benefits of both a much shorter wall clock time to complete the tasks, and using less machine resources as measured by CPU minutes and SIO events.

It is a further object of the present invention to provide a method for recycling a data record already read into local memory back though selected or all processes when there has been a change in a data field of the data record that could result in further changes by such recycling, such as if the name or address changes, or other descriptive information changes such as social security number, date of birth, driver's license state and number, or telephone number.

It is a further object of the present invention to provide an improved method for matching data records by utilizing a table driven matcher which uses not only full personal and firm name (including contact names at a firm) and address, but also uses additional names and addresses, as well as, optionally additional data, such as date of birth, social security number or part thereof, driver's license state and number, current or prior phone number, or the last seven digits of USPS Delivery Point Code (DPC). Such an improved matching process results in more accurate matching of data records, and provides the end user the ability to both understand the matching criterion used and to also fine tune or customize the criteria used for the match.

It is a further object of the present invention to provide a method for generalized linking of consumer and business records.

It is a further object of the present invention to provide a method for improving the description of the characteristics of an address and the property at the address. That is, the present invention provides additional data fields and values for data fields to improve the description of certain aspects of a data record content.

It is a further object of the present invention to provide a method for improving the description of the characteristics of a person or family independent of the address corresponding to the person.

It is a further object of the present invention to provide a method for improving the description of a person or family at the address, or series of addresses by creating a life cycle to-date for each person and family.

It is a further object of the present invention to provide a method for imputing the relationship between two or more persons based on the current and prior addresses, i.e., provide the means to indicate whether two or more persons have lived together or apart.

It is a further object of the present invention to provide a method for matching a female's maiden name to her married name(s). This is a very important object of the present system because most women either change their last name to their husband's last name when they marry or take a new last name which joins their maiden last name with their husband's last name.

It is a further object of the present invention to provide a method for assigning and maintaining a unique unchanging key for a front door of a living unit or firm, including the front door of an apartment or suite in a USPS defined "high-rise."

It is a further object of the present invention to provide a method for verifying a USPS non-city deliverable address, and other addresses that are valid locations but not recognized by the USPS.

It is a further object of the present invention to provide a method for assigning and maintaining a unique and unchanging key to identify a unique unchanging person (homosapiean) using a multitude of available but not consistently available data across all such persons descriptive and associated data.

It is a further object of the present invention to provide a method for assigning a key for a person at an address that is unique and unchanging.

It is a further object of the present invention to provide a method for allowing easy setup, testing and ongoing audits of data records and the processing thereof.

It is a further object of the present invention to provide a method for providing a database file to a third party with associated software to allow use of the provided database, such as appending new data fields and values to the database records or using the database to improve match rates or match confidence, without allowing the third party direct access to the data records in the database in clear text form.

It is a further object of the present invention to provide a method for preventing a third party which has been provided a database file of the present invention, and software for use of such database, from modifying usage reporting of such data without detection of such modifications.

It is a further object of the present invention to provide a method for processing the data records of a database input file in significantly less wall clock time, using fewer CPU minutes, fewer I/O events, and less disk space.

It is a further object of the present invention to provide a method for using these above techniques for data other than name and/or address and/or associated other data, such as, research data in medical research, highway accident research and other endeavors.

It is a further object of the present invention to provide a system that optimizes the recycling of a data record read from an input file during the processing of that data record against multiple reference files. Thus, when a data value changes in a data record being processed, the present invention recycles or re-processes the data record against one or more previously accessed reference files, thereby eliminating the need for extra reads/writes of remote storage which in turns reduces wall clock time, usage of machine resources, and errors.

It is a further object of the present invention to provide a system that enables the processing of an input file against reference files originating from separate and independent vendors which otherwise would be non-cooperative. The present system provides a seamless, easy, and efficient actual or effective comingling of data from independent sources.

It is further object of the present invention to process the data records of an input file simultaneously against multiple resource files.

It is a further object of the present invention to provide for conditional processing of an input file wherein users may change or terminate additional processing of reference files when they believe the best results have already been obtained.

It is a further object of the present invention to provide a means for controlling the sequencing or prioritization of the processing order of reference files to obtain the best results at the lowest cost to the user.

It is a further object of the present invention to provide a user the ability to compute and use multiple search keys for obtaining additional matches in the reference files that would not have otherwise been obtained if only a single search key was used.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

Figure 1:
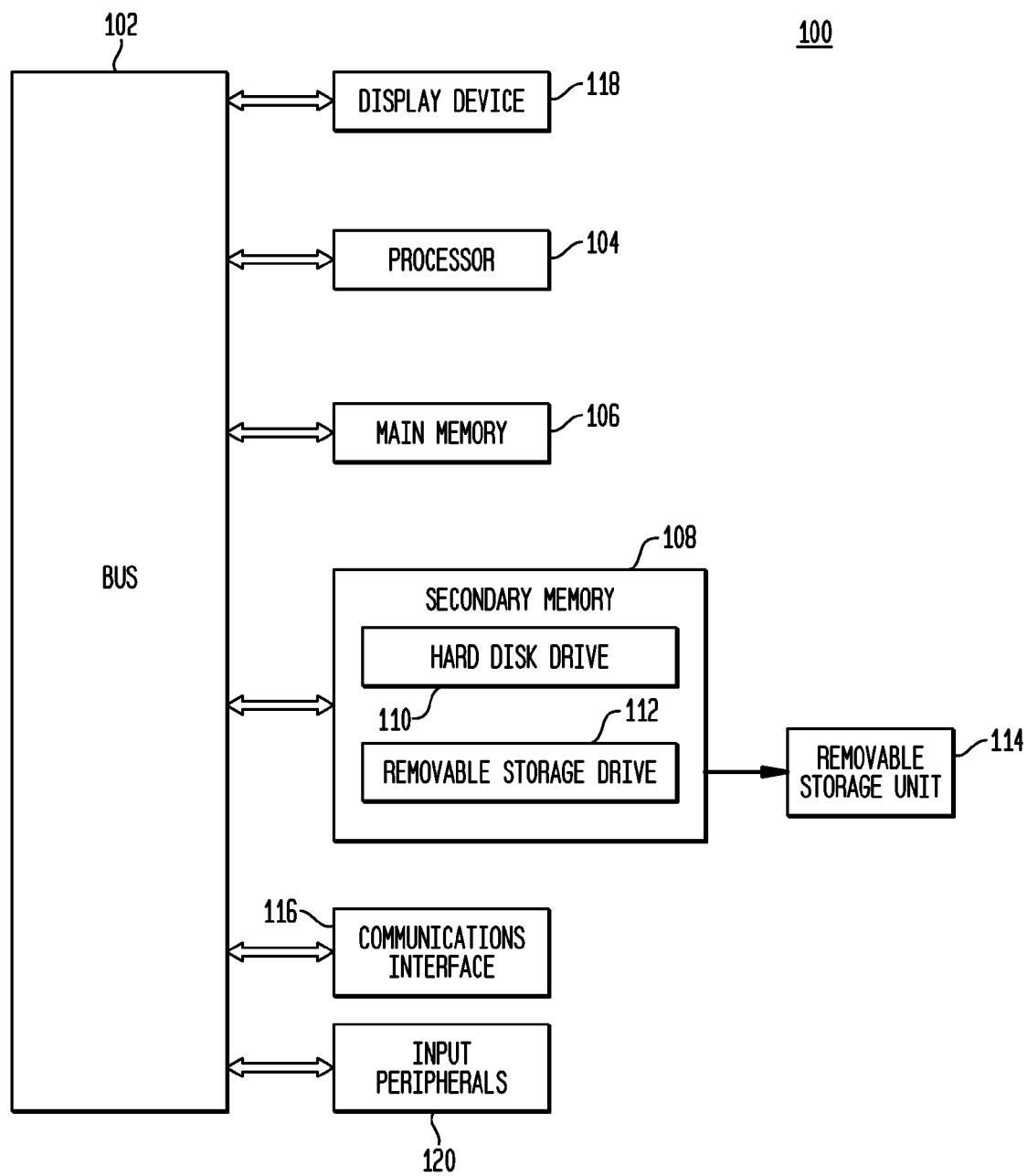
FIG. 1 is a block diagram showing an exemplary computer system.

The chosen embodiment of the present invention is computer software executing within a computer system. FIG. 1 shows an exemplary computer system 100. The computer system 100 includes one or more processors, such as a processor 104. The processor 104 is connected to a communication bus 102.

The computer system 100 also includes a main memory 106, preferably random access memory (RAM), and a secondary memory 108. The secondary memory 108 includes, for example, a hard disk drive 110 and/or a removable storage drive 112, representing a floppy disk drive, a magnetic tape drive, a compact disk drive, a program cartridge and cartridge interface, a removable memory chip (such as EPROM, or PROM), etc. which is read by and written to by a removable storage unit 114. The removable storage unit 114, also called a program storage device or a computer program product, represents a floppy disk, magnetic tape, compact disk, etc. As will be appreciated, the removable storage unit 114 includes a computer usable storage medium having stored therein computer software and/or data. The removable storage drive 112 reads from and/or writes to a removable storage unit 114 in a well-known manner.

The computer system 100 may also include other similar means for allowing computer programs or other instructions to be loaded. Such means can include, for example, a communications interface 116. Communications interface 116 allows software and data to be transferred between computer system 100 and external devices. Examples of communications interface 116 can include a modem, a network interface (such as an Ethernet card), a communications port, etc. Software and data transferred via communications interface 116 are in the form of signals, which can be electronic, electromagnetic, optical or other signals capable of being received by communications interface 116.

In this document, the term "computer program product" is used to generally refer to removable storage unit 114, a hard disk installed in hard disk drive 110, and signals transferred via communications interface 116. These computer program products are means for providing software to a computer system 100.

In an embodiment where the invention is implemented using software, the software may be stored in main memory 106, or in a computer program product and loaded into computer system 100 using removable storage drive 112, hard disk drive 110, or communications interface 116. The software, when executed by the processor 102, causes the processor 102 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is also directed to a computer system 100 including a display device 118 and one or more input peripherals 120. The display device 118 represents a computer screen or monitor on which a graphical user interface, including a window environment, may be displayed. The input peripherals 120 include, for example, a keyboard, a mouse, a light pen, a pressure-sensitive screen, etc., which provide a user with the capability of entering input to the computer system 100.

The preferred embodiment of the present invention is directed to execute on a computer system 100 using essentially any operating system, including without limitation, IBM, VSI, OS390, Z90, Microsoft Windows, UNIX, LINUX, and AS400 operating system, all of which are commercially available and are well known in the relevant arts. The preferred computer system 100 is an IBM compatible mainframe computer, but the present invention also can be developed on a workstation, server, or other computer.

The present invention also is described in terms of a computer system 100 having a single processor 104 for convenience purposes only. It would be readily apparent, however, to one skilled in the relevant arts to use a computer system 100 having multiple processors 104, thereby executing the present invention in parallel. There are no memory requirements for developing and executing the present invention. However, the computer system 100 achieves better performance with more main memory 106 and secondary memory 108. The preferred embodiment of the present invention is implemented in software, and more specifically, is written in the Mainframe Assembly programming language.

The preferred embodiment is described in these terms for convenience purpose only. Other comparable computer systems 100, operating systems, and programming languages could alternatively be used.

Figure 2:
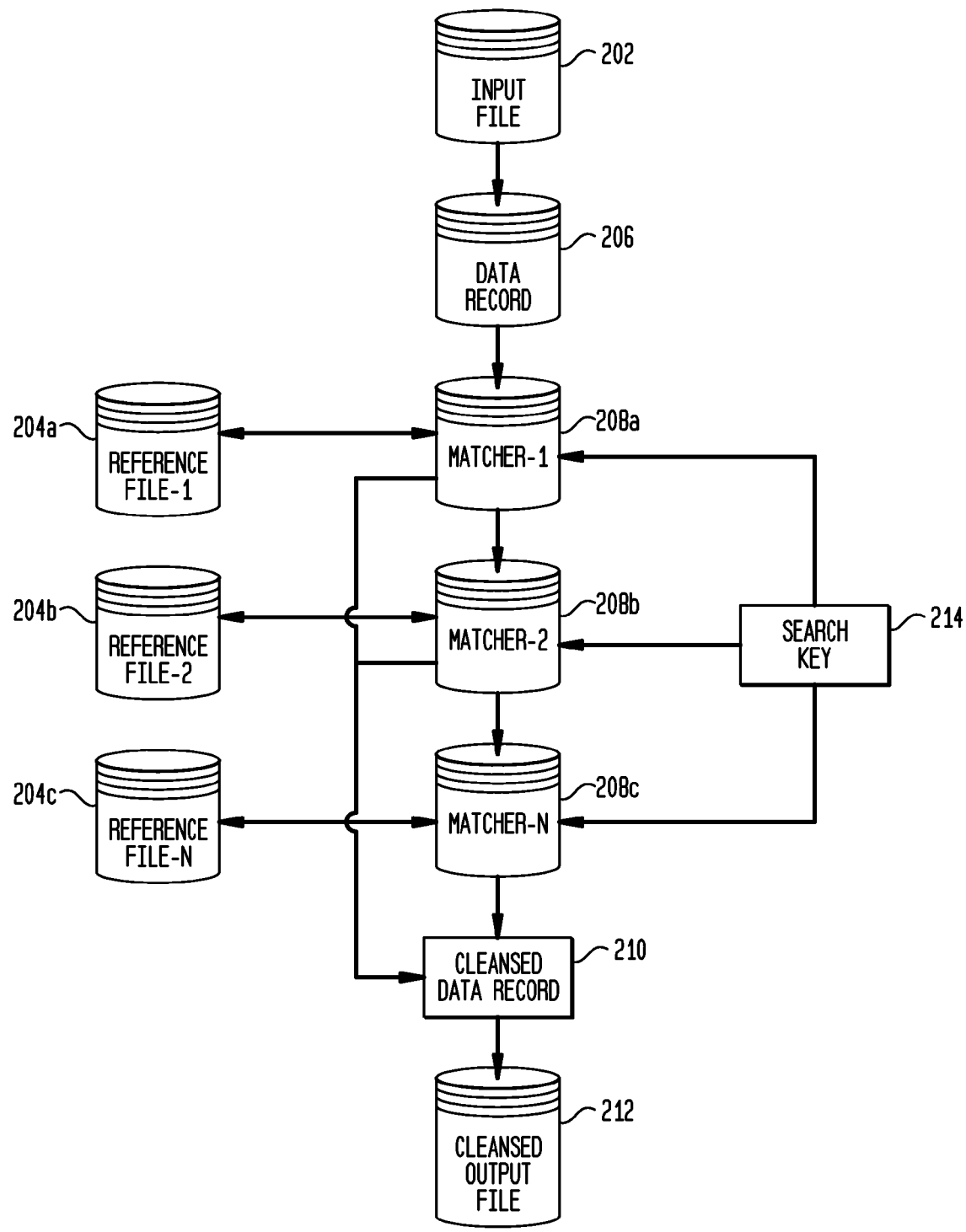
FIG. 2 is a block diagram showing an overview of the method of the present invention.

Referring to FIG. 2, a high level structural diagram of a preferred embodiment of the matching process, or method, 200 of the present invention is shown. Although diagramed in the abstract, the preferred application or use of the method 200 of the present invention is with a complete database containing contact and identification information on both persons and businesses, e.g., name, address, telephone number(s), social security number, date-of-birth, etc., as well as, application specific information contained in a new-data database, e.g., marketing demographics, account information, tax information, consumer information, etc. (reference files). Current applications of the present invention include using the disclosed process and method for data records used by the Internal Revenue Service (IRS), insurance companies (e.g., Globe Insurance), delivery carriers (e.g., Federal Express), document management services (e.g., Lexis Nexus), communication services (e.g., Time Warner), database management services (e.g., Merkle Direct), business computer integration solution services (e.g., LCS Logic), and by any public service provider for assisting in the starting, growing, and operating of businesses (e.g., Masada). The present invention is described in these terms for convenience purpose only. It would be readily apparent to one of ordinary skill in the relevant art to use the method of the present invention for other extremely large databases.

The input file 202 is a data file organized to contain a plurality of data records that can be searched and manipulated by its various data fields and contents thereof. In the preferred embodiment, the input file 202 is a relational database, but this is for convenience only. Thus, the input file 202 contains a plurality of data records to be processed by the method 200 of the present invention. Thus, in the preferred embodiment, an input file 202 may contain millions of data records 206. Also, in the preferred embodiment, the input file 202 is contained on a remote storage device, e.g., optical disk. The data records 206 of the input file 202 are retrieved one at a time or in blocks from remote storage for processing.

The matching process, or method, 200 of the present invention also accesses one or more reference files 204a-c, all of which are also stored on one or more remote storage devices. For example, in the preferred embodiment, the reference files 204a-c may contain data records directed to current address information, change of name information, housing information, and/or demographic information. In the preferred embodiment, a reference file 204 is an originally generated database created by the merging of two or more conventional and commercially available databases, such as, a name and address database and a change of address database, both of which are available from the United State Postal Service (USPS). FIG. 2 is shown with three such reference files 204a-c, but this is for convenience. It would be readily apparent to one of ordinary skill in the relevant art to use any number of reference files 204a-c. In addition, the method 200 inputs a search key 214, which is computed from the data elements of the data records 206 of the input file 202. For example, in the preferred embodiment, the search key 214 may be a person's name, social security number, postal code, or a combination thereof. The search key 214 may be either contained within and retrieved from a reference file 204, or generated by a matcher 208.

Once an input file 202 and one or more reference files 204a-c are selected, and the search key 214 computed, the method 202 repeatedly reads, or retrieves, a data record 206 from the input file 202 and processes that data record 206 against all of the reference files 204a-c, thereby generating a cleansed data record 210. The data record 206 is maintained in local storage during its processing against all of the reference files 204a-c. The present invention then writes the cleansed data record 210 to an output file 212 stored on a remote storage device. Each data record 206 of the input file 202 is processed in sequential order wherein each data record 206 is read from the input file 202 and written to the output file 212 one time each. Once all of the data records 206 of the input file 202 have been processed, or cleansed, through the reference files 204a-c, the output file 212 contains a final, cleansed, and verified set of data records 210.

The processing of a data record 206 is described in further detail. Once a data record 206 is read from the input file 202, it is passed to a matching process, e.g., matcher-1 208. The matcher-1 208a uses the search key 214 to search the data records of the reference file-1 204a. That is, matcher-1 208a searches reference file-1 208a to retrieve all data records in the reference file-1 204a that match the search key 214, thereby generating a candidate data record list. Matcher-1 208a then uses an available matching algorithm, described in greater detail below, to select the one data record from the candidate data record list that most nearly matches the data record 206 of the input file 202 being processed, the matching reference data record.

Data values from the matching reference data record of reference file-1 204*a* are combined with data values in the data record 206 of the input file 202 to create a new cleansed data record 210. This combining process is used to cleanse the data record 206 being processed. Cleansing means: (i) completing missing data elements in the data record 206, (ii) correcting garbled data elements in the data record 206, (iii) enriching (overlaying) the data record in the data record 206 by providing new data elements from the matching reference data record of the reference file-1 204*a*, (iv) replacing the data record 206 with the matching reference data record, or (v) verifying that the data in the data record 206 is correct.

Once the data record 206 has been processed and cleansed according to reference file-1 204*a*, the method 200 passes the resulting cleansed data record 210 to the next matcher process. Thus, for example, as shown in FIG. 2, the method 200 passes the cleansed data record 210 to matcher-2 208*b* which repeats the processing of the cleansed data record 210 with the data records of reference file-2 204*b* in a similar operation as described above with matcher-1 208*a*. Once the processing is complete, the method 200 continues the processing of the cleansed data record 210 with the subsequent matcher-3 208*c* and reference file-3 204*c*. Although only shown with three reference files 204*a-c*, the present invention works with any number of reference files 204*a-c* and matchers 208*a-c*, wherein each reference file 204*a-c* has its own matcher 208*a-c*. However, in an alternative embodiment, a single matcher 208 may access multiple reference files 204. Once all the matchers 208*a-c* and reference files 204*a-c* have been exhausted, the resulting cleansed data record 210 is written out to remote storage to an output file 212.

The matchers 208*a-c* use high-speed direct access memory, currently referred to as Random Access Memory (RAM), or main memory 106. The remote storage that is preferably used for the input file 202, the reference files 204*a-c* and the output file 212, are currently typified by mechanical storage devices, e.g., rotating disk storage devices, accessible via secondary memory 108 and/or a communications interfaced 106. Such remote storage devices typically can economically store extremely large amounts of data, much more than is practical or economical to store in main memory 106 RAM. Key to the present invention is that only one access is required per reading of a data record 206 of the input file 202 and only one access is required typically to each reference file 204*a-c* unless the block overflows for the search key 214 used to create the candidate reference data records. This is described below in greater detail.

Figure 3:
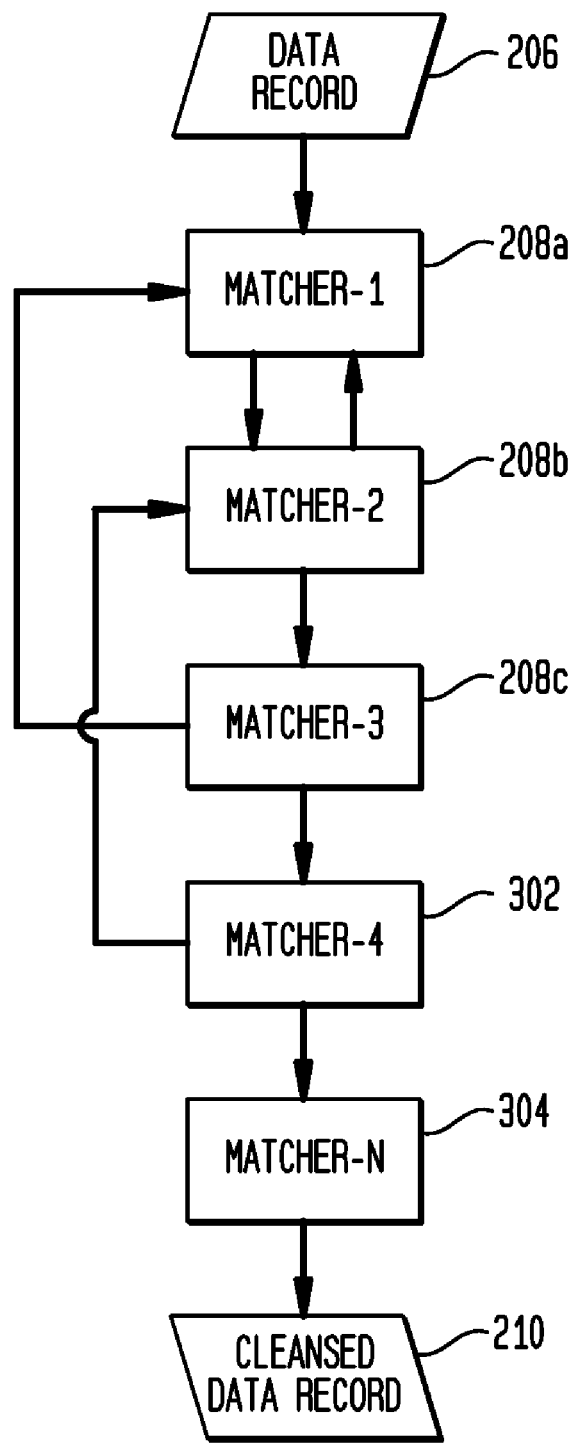
FIG. 3 is a block diagram showing the recycling of a data record back through processes previously performed.

Referring to FIG. 3, a high level structural diagram of a preferred embodiment of the present invention, is shown relating to recycling 300 a data record 206 back through processes, or matchers 208*a-c*, previously performed. The reference files 204*a-c* associated with each matcher 208*a-c* are not shown on FIG. 3 for clarity. A data record 206 of the input file 202 is processed as in the explanation of FIG. 2, except if any data record 206 is changed by any specific matcher 208*a-c*, the data record 206 may be recycled back through any one or more prior processes, or prior matchers 208*a-c*.

For example, a process, such as associated with matcher 1 208*a*, may only use certain elements of the data record 206, such as the address, in the search key 214 when searching reference file-1 204*a*. Therefore, if the recycling method 300 does not change any data elements of data record 206, or only other data elements of data record 206 are changed by the cleansing process associated with matcher-3 204*c*, the data record 206 would not be recycled back to matcher-1 208*a*. Similarly, the process associated with matcher-2 204*b* may use any of the data elements that may be cleansed in the output of matcher-4 302 and thus all data records changed in the cleansing process out of matcher-4 302 would be recycled. Significant is that this recycling 300 is preformed with the data record 206 being read from remote storage and written to remote storage only once for the entire set of matching processes 208-*ac*, 302, 304 with significant savings in overall cycle time (wall clock time) and machine resources.

Figure 4:
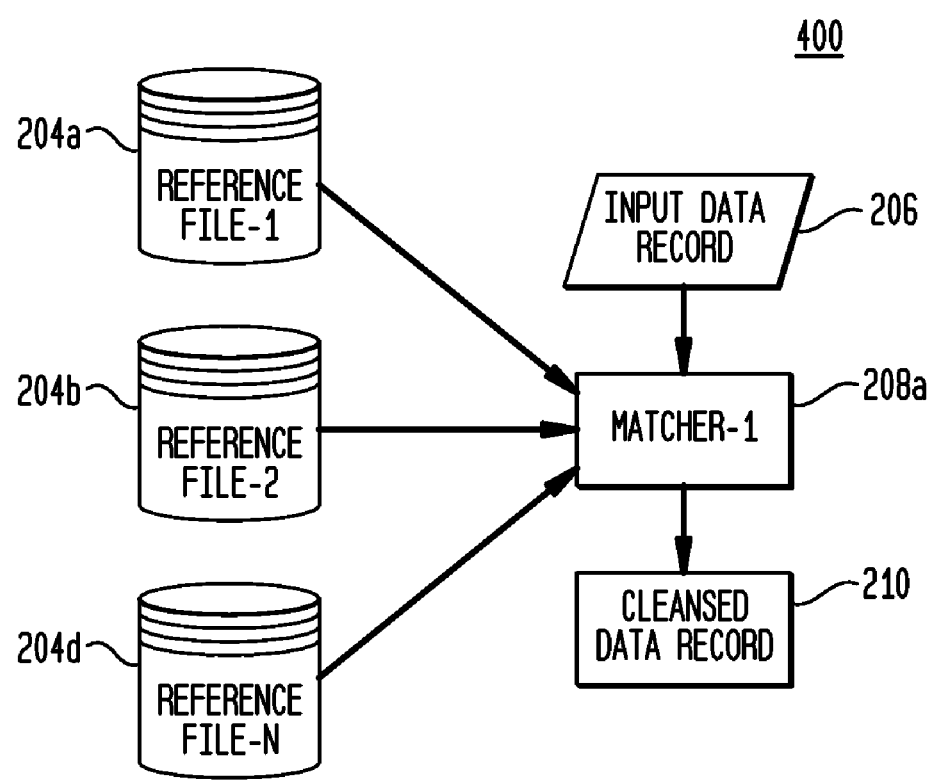
FIG. 4. is a block diagram showing the recycling of a data record through multiple reference files.

Referring to FIG. 4, a high level structural diagram of a preferred embodiment of the present invention is shown illustrating the recycling of a given data record 206 of an input file 202 through a single matcher, e.g., matcher-1 208*a*, multiple times using different reference files 204*a,b,d*. Again, the use of three reference files 204*a-c* is for illustrative purposes only. It would be readily apparent to use any number of reference files 204 with the present invention as indicated by the number 'N' on element reference number-N 204*d*. In this example, each data record 206 of the input file 202 is processed as in the explanation of FIG. 2 above by matcher-1 208*a* and reference file-1 204*a*. Once this initial processing is complete, the process 400 returns the data record 206 back to matcher-1 208*a* for processing using a different reference file 204, e.g., reference file-2 204*b*. In particular, either the original data record 206 or the cleansed data record 210 (as may be optionally specified) is returned to matcher-1 208*a* for this new, second processing. This action is repeated in that the data record 206 or the cleansed data record 210 is returned to matcher-1 208*a* for processing with each available reference file 204, which as shown on FIG. 4 is reference file 204*a, b, d*.

In the preferred embodiment, logic is used in the selection of the data records from each reference file 204*a-d* to create the candidate data record list. For example, the search key 214 may select the lower cost data or the best quality data or some combination thereof of these two metrics. An example would be telephone data with the following three characteristics as detailed below in Table 1:

TABLE 1

| Reference File | Average Time Since Verified | Accuracy Rating on Each Record | $ Cost Per 1000 |
|---|---|---|---|
| Phone File 1 | 15 months | 90% | 5 |
| Phone File 2 | 12 months | 85% | 7 |
| Phone File 3 | 3 months | 95% | 9 |

Thus, with such a table, if lowest cost is the preferred selection metric, then the matcher-1 208*a* processes the data record 206 using the reference files 204*a-c* in the sequential order number 1, 2, and then 3, because this is the order as defined by the cost metric. Matcher-1 208*a* stops searching each reference file 204*a-c* once a good match is found by conventional matching techniques. However, if greatest accuracy is the preferred selection metric, then the matcher-1 208*a* processes the data record 206 using the reference files 204*a-c* in the order number 3, 2, and then 1 because this is the order defined by the accuracy rating of each reference file 204*a-c*. Matcher-1 208*a* stops searching each reference file 204*a-c* once a good match based on this metric value is found.

Furthermore, customized logic algorithms may be created according to the specific needs of the processing of the input file 202. For example, if all of the data records 206 of the input file 202 have been processed by the matchers 208 and all of the matching data records of the reference files 204 for a specific data record 206 provide the same telephone number, then the method 400 may chose to use the data values of the reference file 204 having the lowest cost data, e.g., reference file 1 204*a* in Table 1. This is for convenience purpose only. It would be readily apparent to one of ordinary skill in the relevant art to use alternative logic in determining a default reference file 204 to use. Also, each matcher 208 may employ different and distinct logic algorithms for controlling the selection of default data values to use from the reference files 204. It is important to note that the recycling of data records 206 through multiple reference files 204*a-d* is preformed with the data record 206 being read from the input file 202 contained on remote storage 202, and being written to the output file 212 contained on remote storage, only one time each during the processing of the data record 206.

Figure 5:
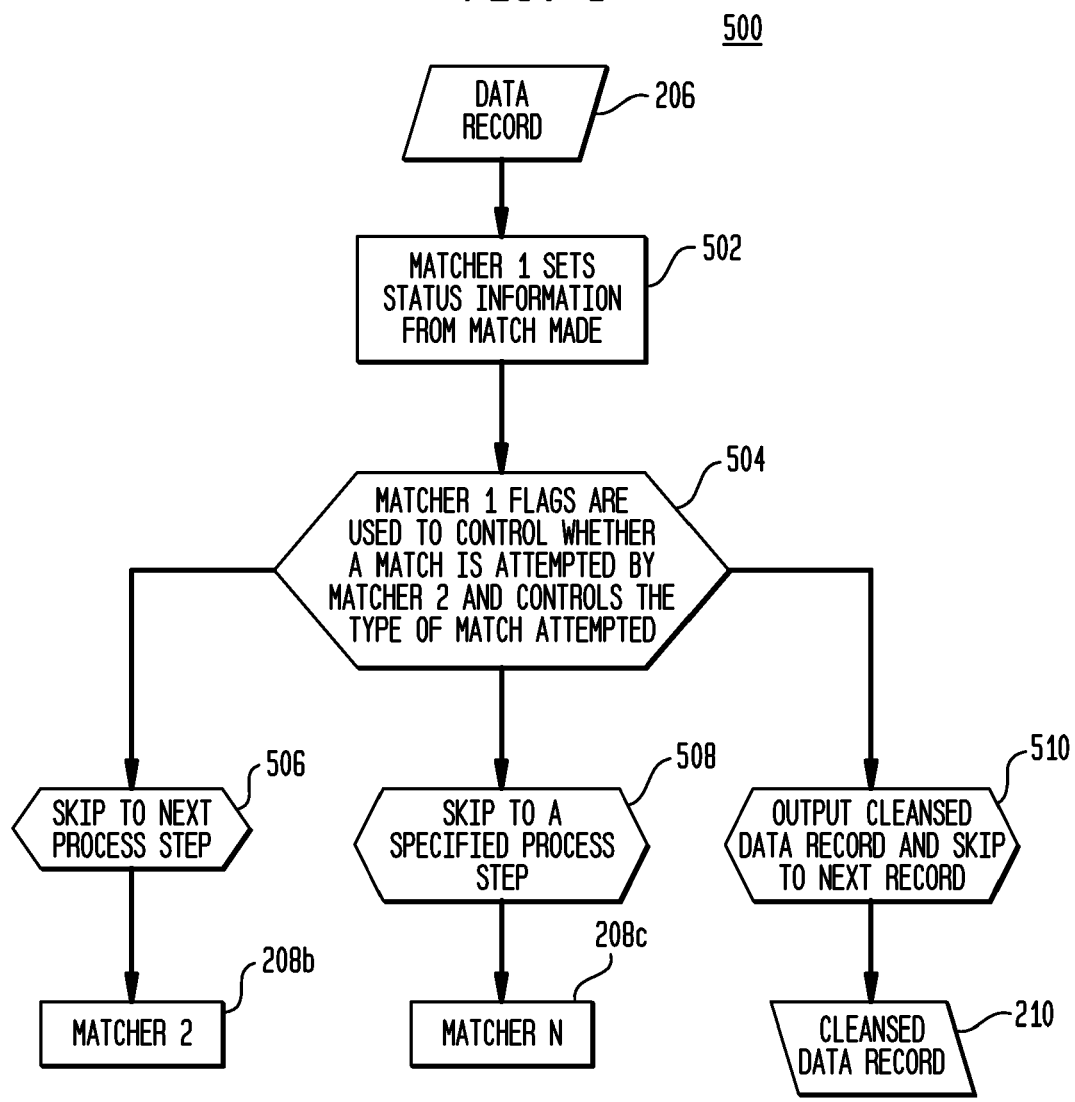
FIG. 5 is a block diagram showing the matching of data records using a plurality of matching processes.

Referring to FIG. 5, a high level structural diagram of a preferred embodiment of the present invention is shown directed to the use of logic algorithms for controlling the searching and matching of data records in the reference files 204. The reference files 204 associated with each matcher 208 are not shown for clarity purpose only. In this process, the data records 206 of an input file 202 are processed as in the explanation above of FIG. 2, with the exception that matcher-1 208*a* uses an additional logic algorithm to determine the flow of processing of the data record 206 to subsequent matchers 208*b-c*. For example, in step 502 matcher-1 208*a* sets the status information from the match made with a reference file 204. Once the status information is determined, processing continues to step 504 wherein matcher-1 208*a* analyzes the flags generated from the matches with the reference files 204 and determines which, if any, subsequent matcher 208*a-c* is to process the data record 206 next. Thus, in step 504 matcher-1 208*a* continues the processing to either: (1) the matcher-2 208*b* in step 506, (2) any matcher, e.g., matcher-N 208*c*, or (3) proceed to steps 510 and 512 wherein all remaining matchers 208 are skipped and the resulting cleansed data record 210 is written to the output file 212.

Figure 6:
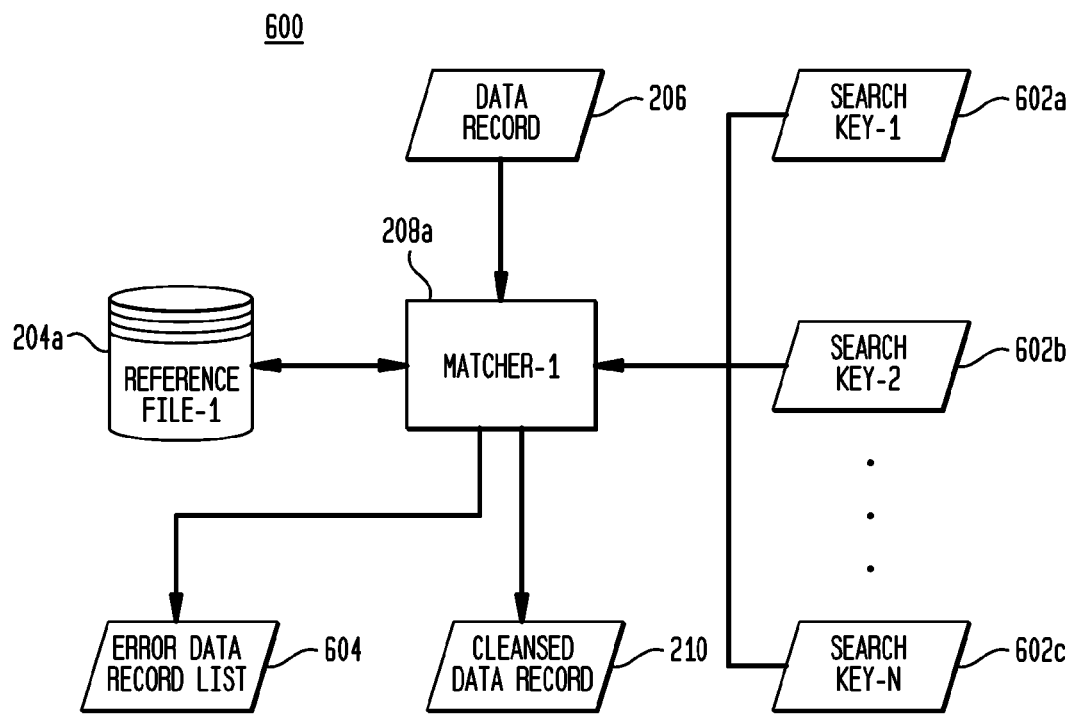
FIG. 6 is a block diagram showing the matching of data records using multiple keys.

Referring to FIG. 6, a high level structural diagram of a preferred embodiment of the present invention is shown wherein a matcher 208 accesses multiple search keys 602. For convenience and clarity purposes only, FIG. 6 shows only one matcher, matcher-1 208*a*, and one reference file, reference file-1 204*a*. However, the process 600 of FIG. 6 can be implemented with any number of matchers 208 and reference files 204. In this process 600, a data record 206 is processed as in the explanation of FIG. 2 above, except the matcher-1 208*a* uses multiple search keys 602 to access data records from reference file-1 204*a*. As shown, matcher-1 208*a* accesses search key-1 602*a*, search key-2 602*b*, and subsequent search keys until search key-N 602-*c*. For example, a typical search key-1 602*a* may include a specific, or pre-defined, name and address of a person or business. Furthermore, an example of multiple search keys may be:

search key-1 602*a*=# digits of a zip code+# digits of house number+# characters of street name+# characters of person's surname
search key-2 602*b*=state abbreviation+soundex surname+soundex first name+middle initial+gender
search key-3=phone number
search key-4=social security number (or part thereof)

The use of the above multiple search keys 602 is for convenience only. It would be readily apparent to one of ordinary skill in the relevant art to use any number of search keys 602 and any appropriate value for each such search key 602 as needed for matcher-1 208*a*. In this above example, it is important to note that no data field is repeated in any of the multiple search keys 602. Therefore, matcher-1 208*a* of the present process 600 may also generate an error data record list 604 wherein each such data record on the list 604 matches only a subset of the search keys 602*a-c* and not all of the search keys 602. Because a data record of the reference file-1 204*a* does not match all of the search keys 602, there must be erroneous data contained with that data record. The data records of the error data record list 604 may be handled on an individual basis at a later time wherein the data contained in such data records is corrected or modified appropriately to match the correct data in the search keys 602 or in other reference files 204.

In operation, the matcher-1 208*a* accesses the multiple selected keys 602, such as those examples above (search key-1 602*a*, search key-2 602*b*, and search key-N 602*c*) sequentially one at a time to find data records in the reference file-1 204*a*. The matcher-1 208*a* may either retrieve the search keys 602*a, b, c* from the reference file-1 204*a*, or may compute them itself. In one embodiment, the matcher-1 208*a* uses the search key 602 that will produce the most matches first, followed by the next search key 602 that will produce the next most matches, and so on. All such matches are places in the candidate data record list as described in FIG. 2. In an alternative embodiment, the matcher-1 208*a* uses search key-1 602*a* and simply accepts the matching data records in the resulting candidate data record list, thereby eliminating the searching of the reference file-1 204*a* with the other search keys 602*b,c*. Once the candidate data record list is generated by processing all of the multiple search keys 602, the matcher-1 208*a* goes through the data records of the candidate data record list to find a good single matching data record that matches the current data record 206 from the input file 202 that is being processed. Since this processing 600 is performed while the data record 206 remains in RAM and only a smaller and smaller number of data records must be read from the reference file-1 204*a* stored on remote storage for the processing of sequential search keys 602, this process 600 uses machine resources efficiently and minimizes additional cycle time.

Regarding the use of a single search key 214, the present invention constructs or retrieves a search key 214 as described above in FIG. 2 such that the search key 214 minimizes the searching of data records in the reference file-1 204*a* that match the search key 214, thereby minimizing the number of reads from the reference file-1 204*a* on remote storage. In this embodiment, the data records of reference file-1 204*a* are structured on remote storage such that all of the data records matching a specific search key 214 are stored as a continuous block of memory on the remote storage. Thus, in this embodiment, the process 200 defines a primary physical block of remote storage for storing data records from the reference file-1 204*a* that match the search key 214. Optionally, the process 200 may also define an overflow physical block of remote storage for the search key 214 with an address pointer linking a specific overflow physical block of remote storage to its corresponding primary physical block of remote storage. Thus, in operation, when searching the reference file-1 204*a* by a specific search key 214, the matcher-1 208*a* determines a candidate data record list wherein all of the data records included on the candidate data record list are stored in a primary physical block of remote storage, and if needed, in its corresponding overflow physical block of remote storage. This feature results in the matcher-1 208a performing a minimum number of reads, i.e., one or two reads, from remote storage in order to obtain all of the data records from the reference file-1 204a that match the search key 214 because all of such data records are stored in a minimum number of continuous physical blocks on the remote storage. Once the data records are retrieved from the physical block(s) of remote storage, the matcher-1 208a completes its matching process of the data record 206 from the input file 202 to the data records of the resulting candidate data record list and selects the data record from the candidate data record list that is a best match, and outputs that data record as described above in the description of FIG. 2.

As discussed above, a matcher 208 of the present invention determines whether a match is found. The matching performed by a matcher 208 occurs between a search key 214, 602 and a data record of a reference file 204, as well as, between a data record 206 of an input file 202 and a data record of a reference file 204. Thus, the following discussion pertaining to matching is directed to either type of matching.

Table 2 below is a preferred embodiment of the present invention indicating the required degree of matching needed. In general, for each data field in the data records of a specific reference file 204 for which there is a corresponding data field in the data record 206 of the input file 202, Table 2 defines the match vector required in order for a matcher 208 to determine that a match has been made. Each of the cells in Table 2 contains a value for a degree of match. The column or "degree of match vector" then describes how much of a match has occurred between all the data fields in common between the two data records being compared.

Example data fields include, but are not limited to: First Name, Middle Name, Surname, Generational Suffix, Gender, Social Security Number (SSN) or part thereof, Data or Birth (DOB), Phone Number or part thereof, Driver's License Number or part thereof, House Number or part thereof, House Number Suffix, Street Pre Directional, Street Name, Street Suffix, Street Post Directional, Unit Type, Unit Number, City, State, and ZIP Code. Other variables would be applicable in different applications of the present invention, such as in automotive accident data linking (police, ambulance and hospital records), medical data linking, and the like.

Also in the preferred embodiment, the degree of match is quantified as an alphabetic character wherein each assigned character approximates a descending order of matching. For example, the following characters may be assigned:

| | |
|---|---|
| A = | Complete character for character match |
| B = | NYSIIS encoding of text data field match |
| C = | Nick Name Match |
| D = | Soundex encoding of text data field match |
| E = | If non-blank or non-zero character for character match |
| F = | Two characters interchanged match with a minimum specified number of characters |
| G = | One character does not match with a minimum specified number of characters |
| H = | One character missing with a minimum specified number of characters |
| I = | All characters present but out of order with a minimum specified number of characters |
| J = | Initial characters only match, where one or both of the data records being compared have only an initial character |
| K = | Both data fields of the data records being compared are non-blank and non-zero and they do not match by any above criterion |
| L = | One or both of the data fields of the data records being compared are blank |
| M = | If present, the data fields match, however, their being present is not required, only if they are present, they must match is required |
| Y = | Gender is female |
| Z = | Apparent no match because no matching relationship found in above list |

Thus, based on the above matching criteria, Table 2 below defines the degree of matching for two data records, and then whether the two data records are a match or not:

TABLE 2

| | | Vectors representing possible matches between the data record of the input file and a data record of a reference file | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| a | Data Fields | | | | | | | | | | | | | | |
| b | First Name | A | A | A | A | J | J | J | J | B | B | B | B | | Z |
| c | Middle Name | | | | J | J | J | J | | | | | J | | Z |
| d | Surname | A | A | A | A | A | A | A | A | A | A | A | A | | Z |
| e | Generational Suffix | | | | | | | | | | | | | | Z |
| f | Gender | | | | | | | | | | | | | | |
| g | SSN, last seven digits | A | | | | A | | | | A | | | | | Z |
| h | DOB | | A | | | | A | | | | A | | | | Z |
| i | Phone Number | | | A | | | | A | | | | A | | | Z |
| j | ZIP | A | A | A | | A | A | A | | A | A | A | | | Z |
| k | Delivery Point Code Digits 6 though 11 | A | A | | A | A | A | | A | A | A | | A | | Z |
| l | House Number | | | | A | | | | A | | | | A | | Z |
| m | Street Pre Directional | | | | | | | | | | | | | | Z |
| n | Street Name | | | | A | | | | A | | | | A | | Z |
| o | Street Suffix | | | | A | | | | A | | | | A | | Z |
| p | Street Post Directional | | | | | | | | | | | | | | Z |
| q | Unit Type | | | | | | | | | | | | | | Z |
| r | Unit Number | | | | | | | | | | | | | | Z |

TABLE 2-continued

Vectors representing possible matches between the data record of the input file and a data record of a reference file

| | | | | | |
|---|---|---|---|---|---|
| s | Postal City Name | A | A | A | Z |
| t | State Abbreviation | | | | Z |
| u | County Code | | | | Z |
| v | Defined as a M = Match or N = No Match | M M M M M M M M M M M ... | | | N |

The last row (row v) of Table 2 defines for the specified level of match of the individual data fields, whether that combination of data fields, between the two data records being compared (a data record 206 of the input file 202 being compared to a data record of a reference file 204), is determined to be a match or not. Any blank data field is simply ignored and does not impact the determination of a match or not.

Also, if a matcher 208 uses a predefined minimum level of match for determining whether a match exists or not, then if the level of match for any individual data field is greater than such a minimum level of match, the above Table 2 values still apply. In addition, exception vectors may be used to cause data records within the class of matches represented by that vector to either match or not match not withstanding which side of the match no-match surface that specific vector exists.

Table 2 is described in these terms for convenience purpose only. It would be readily apparent to one of ordinary skill in the relevant art to use a matching table having any number of rows or matching values. For example, additional rows may be included in such a matching table for other results besides match or no-match, such as, manual review of the two data records suggested, hard match or hard no match, data record 206 of the input file 202 verified, match good enough to make a completion of one or more missing data values of the data record 206 of the input file 202, or match is good enough to make a correction to a wrong data value of the data record 206 of the input file 202.

Furthermore, Table 2, or a similar matching table, may be constructed in any of several ways:

(1) a collection of columns of degree of match vectors at the surface which defines that vector, or any vector as on one specified side of the surface, is a match and on the other is a no-match;

(2) an extensive set of columns of degree of match vectors that are defined as either match or no-match;

(3) a combination of the two approaches, where specific columns of match values may override the other approach as either a match or no-match depending on a predefined flag;

(4) start with any of the above and for those remaining vectors that are not specified as to match or no-match, compare a large number of typical records and determine their column of match values, i.e., degree of match vectors, then display a small sample of the record pairs for each unique degree of match vector for manual determination of the match or no-match value, preferably in descending frequency of occurrence of the number of matching data records in each degree of match vector;

(5) start with the matching established by another matching process to define whether a pair of data records is a match or no-match. If within the same vector there are both matching and non-matching data records determined by this other process, then manually review a sample of the matching and non-matching records for a final determination; or (6) a client may make a determination that any vector represents either a match or no match.

Additionally, to deal with data records pertaining to businesses wherein a data record contains a contact-person's name mixed with consumer data records, all that needs to be done is to add the business name field, and possibly other identifying fields, such as, doing business as (d/b/a) name(s), or P.O. Box address, to the existing data fields of the data records in a reference file 204 and in the input file 202, and to provide new rows in Table 2 for the these additional data fields.

Also, to deal with matching a female's maiden name to her married name, additional column entries are made in Table 2, resulting in a new Table 3 shown below:

TABLE 3

Vectors representing possible matches between a data record of the input file and data records of a reference file

| | Data Fields | 1 | 2 | 3 | 4 | 5 | 6 |
|---|---|---|---|---|---|---|---|
| a | Data Fields | | | | | | |
| b | First Name | A | A | A | A | A | A |
| c | Middle Name | A | A | A | J | J | J |
| d | Surname | | | | | | |
| e | Generational Suffix | | | | | | |
| f | Gender | Y | Y | Y | Y | Y | Y |
| g | SSN, last seven digits | A | | | A | | |
| h | DOB | | A | | | A | |
| i | Phone Number | | | A | | | A |
| j | ZIP | A | A | A | A | A | A |
| k | Delivery Point Code Digits 6 though 11 | A | A | A | A | A | A |
| l | House Number | | | | | | |
| m | Street Pre Directional | | | | | | |
| n | Street Name | | | | | | |
| o | Street Suffix | | | | | | |
| p | Street Post Directional | | | | | | |
| q | Unit Type | | | | | | |
| r | Unit Number | | | | | | |
| s | Postal City Name | | | | | | |
| t | State Abbreviation | | | | | | |
| u | County Code | | | | | | |
| v | Defined as a M = Match or N = No Match | M | M | M | M | M | M |

The present invention also provides a means for constructing a unique, unchanging search key 214, 602 directed to a specific deliverable address, referred to a as a "front door key." Thus, a front door key is a search key 214, 602 that defines a unique "front door" of a deliverable address, whether that "front door" is a residential or a business address.

A front door key is beneficial because a USPS delivery point code (consisting of a zip+4 code) does not provide the needed information for finding a specific "front door." The reasons a USPS Delivery Point Code (DPC) cannot be used as a Front Door Key are: (1) the DPC changes as the five-digit zip code changes for an address; (2) the DPC is not a unique key for one front door, since some zip+4 codes range over more than one hundred block of house numbers; and (3) there are legitimate unit numbers in non-high rises that define different front doors, e.g., when a residence is sub-divided into multiple apartment units. Thus, there is a need for a unique front door key.

Figure 7:
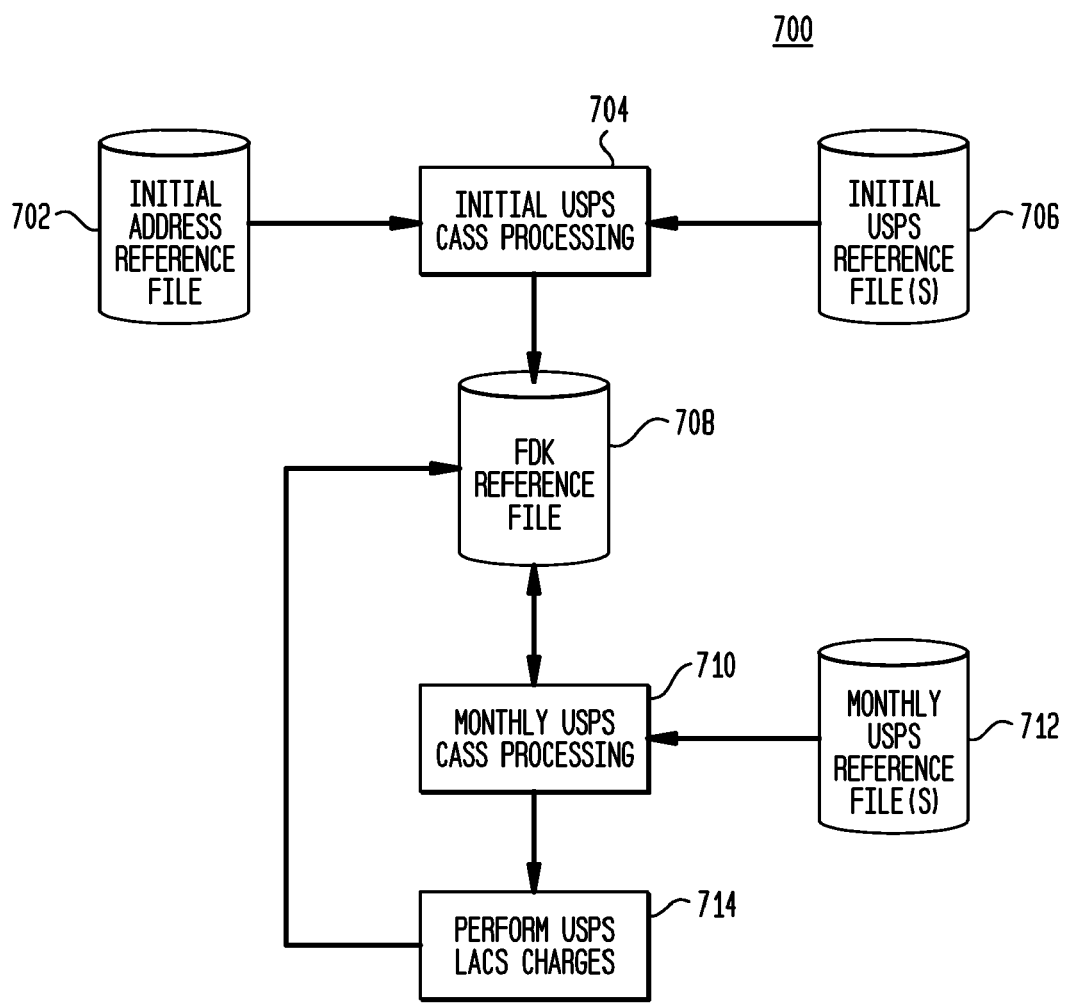
FIG. 7 is a block diagram showing the constructing and maintaining of a front door key (FDK) of the present invention.

The process 700 for constructing and maintaining a front door key (FDK) of the present invention is shown in FIG. 7. This process 700 inputs an initial address reference file 702, which for example may be a client file, a USPS computerized delivery sequence file, a compiled file, or any similar reference file 204 that contains basic name and address information. The process 700 proceeds to step 704 and performs initial USPS Coding Accuracy Support System (CASS) processing wherein the initial address reference file 702 is run through the USPS certified parsing and postal coding software (which is a commercially available software system) against one or more base line initial USPS reference file(s) 706 for the CASS process as of a fixed point in time. Using the initial address reference file 702 and the Initial USPS reference file(s) 706, the process 700 extracts the USPS ZIP+4 code, a predefined number (N) of digits of the corresponding house number, and a predefined number (M) of characters of the unit number (where present) (collectively, "aggregate address code"). The process 700 then assigns a unique non-logic Front Door Key (FDK) to the newly calculated aggregate address code. The FDK and its corresponding aggregate address code are written to a FDK reference file 708. Preferably, the FDK reference file 708 is searchable by either key, thereby providing a two-way indexing or searching scheme.

Once the FDK reference file 708 is created, it is preferably updated each month when the USPS provides its monthly USPS reference file(s) 712. Thus, each month the monthly USPS CASS processing 710 occurs wherein the FDK reference file 708 is updated according to the most recent monthly USPS reference file(s) 712. In addition, the process 700 may select one or more data records in the FDK reference file 708 as requiring a potential Locatable Address Conversion System (LACS) change. For each data record in the FDK reference file 708 that requires such an update, the process 700 performs USPS LACS changes 714 on that data record such that updated address information is written back to the FDK reference file 708.

Once the process 700 has initially created, and has update, the FDK reference file 708, the FDK reference file 708 is returned to the appropriate matcher 208 requiring access to this FDK reference file 708 as a reference file 204 as shown in FIG. 2.

Another feature of the present invention is how personal name records from different reference files 204 are combined to create an unchanging personal name key (PNK). The essence of the present invention is to combine a number of different current and historic source files (such as, for example, credit card information, and name, social security number, and date-of-birth information) with files having one or more of the following variables: driver's license, telephone number, delivery point code (DPC), and the like, to create a unique, descriptive integrated file for each adult individual to which an unchanging PNK may be assigned. Also, the Social Security Administration's Death Master reference file 204, containing the name, social security number, date-of-death, and last known ZIP code of all deceased persons, is used to assist in identifying deceased persons. With these reference files 204, any two data records (either between two different reference files 204 or within the same reference file 204) are linked if there is both a name match and a match on one or more of the above variables. Thus, a linking or matching occurs if the present invention confirms that two data records contain the same name (a name match) and one other variable, e.g., the same social security number or part there of, driver's license number or part thereof, date-of-birth or part there of, telephone number or part thereof, or DPC or part thereof (a variable match). However, if in any case there is a conflicting generational suffix (a reference to "senior," "junior," "III," etc.) or true gender mismatch, then no match is made. Also, in any case where the same identical name occurs at the same telephone number or same DPC or other non-person specific key with a generational suffix, a warning flag should be set because there may be an error. That is, under these conditions a match is determined according to non-person unique data, e.g., a telephone number, so the assumption that the data records represent the same person may be in error. Once such a flag is set and recorded, the corresponding data records may be checked at a later time to ensure accuracy.

Thus, an example of different variables that can be used to generate a PNK is shown in Table 4 below. In Table 4, multiple data records are shown in the columns and possible variables are shown in the rows. Thus, each column represents a different data record of a reference file 204 and each row indicates whether or not a specific data record contains a match (and the degree of such a match) for that given variable. For example, data record 1, shown in column 1, matches on First Name, Middle Initial, Surname and SSN to data record 2, shown in column 2. Data record 3 matches data record 2 on the name elements and DOB, and adds the Driver's License State and Number (DL). Data record 4 similarly adds Phone #1. In using Table 4 to generate a PNK for a given person, the preference is to use SSN, DL, DOB, Phone Numbers and DPC's. A non-logic key is assigned to each resultant combined data record, which becomes the PNK. The data record is indexed on selected data items and combinations of data items and names to allow assigning the PNK. The PNK is also indexed in reverse to allow a matcher 208 to get back the name and descriptive variable for any given PNK. A quality of match score and source of match flag may be set for each source data record and new data items to allow for handling possible data errors.

TABLE 4

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| First Name | Y | Y | Y | Y | Y | Y | Y | Y | Y | Y | Y | Y | Y | Y |   |
| Nick Name |   |   |   |   |   |   |   |   |   |   |   |   |   |   | Y |
| Middle Name | I | I | I | I | I | I | I | I | I | I | I | I | I | I |   |
| Surname 1 | Y | Y | Y | Y | Y | Y | Y | Y | Y | Y | Y | Y | Y | Y | Y |

TABLE 4-continued

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Surname 2 | | | | | | | | | | | | | | | |
| Generational Suffix | M | M | M | M | M | M | M | M | M | M | M | M | M | | |
| Gender | Y | | | | | | | | | | | | | | |
| SSN | Y | Y | | | | Y | Y | Y | Y | Y | Y | Y | Y | Y | Y |
| DOB | | Y | Y | | | | | | | | | | | | |
| DL | | | Y | Y | | | | | | | | | | | |
| Phone #1 | | | | Y | Y | | | | | | | | | | |
| Phone #2 | | | | | | Y | | | | | | | | | |
| Phone #3 | | | | | | | Y | | | | | | | | |
| Phone #4 | | | | | | | | Y | | | | | | | |
| Phone #N | | | | | | | | | Y | | | | | | |
| DPC #1 | | | | | | | | | | Y | | | | | |
| DPC #2 | | | | | | | | | | | Y | | | | |
| DPC #3 | | | | | | | | | | | | Y | | | |
| DPC #4 | | | | | | | | | | | | | | Y | |
| DPC #N | | | | | | | | | | | | | | | Y |

In referring to Table 4, the following definitions apply:

Y = Exact matches
J = Initial characters only match, where one or both files have only an initial character
M = if present, the data fields match, however, their being present is not required, only if they are present, it is required they must match The present invention is preferably used by an owner, vendor, supplier or distributor to provide to a customer one or more reference files 204 and associated software for executing the processes, e.g., process 200, of the present invention to access the reference files 204 so that the customer uses the provided software and reference files 204 to create and access the cleansed data records 210 in a resulting output file 212. It is a preferred embodiment of the present invention to prevent a customer from accessing directly the actual data records of the reference files 204 as well as the output file 212.

Figure 8:
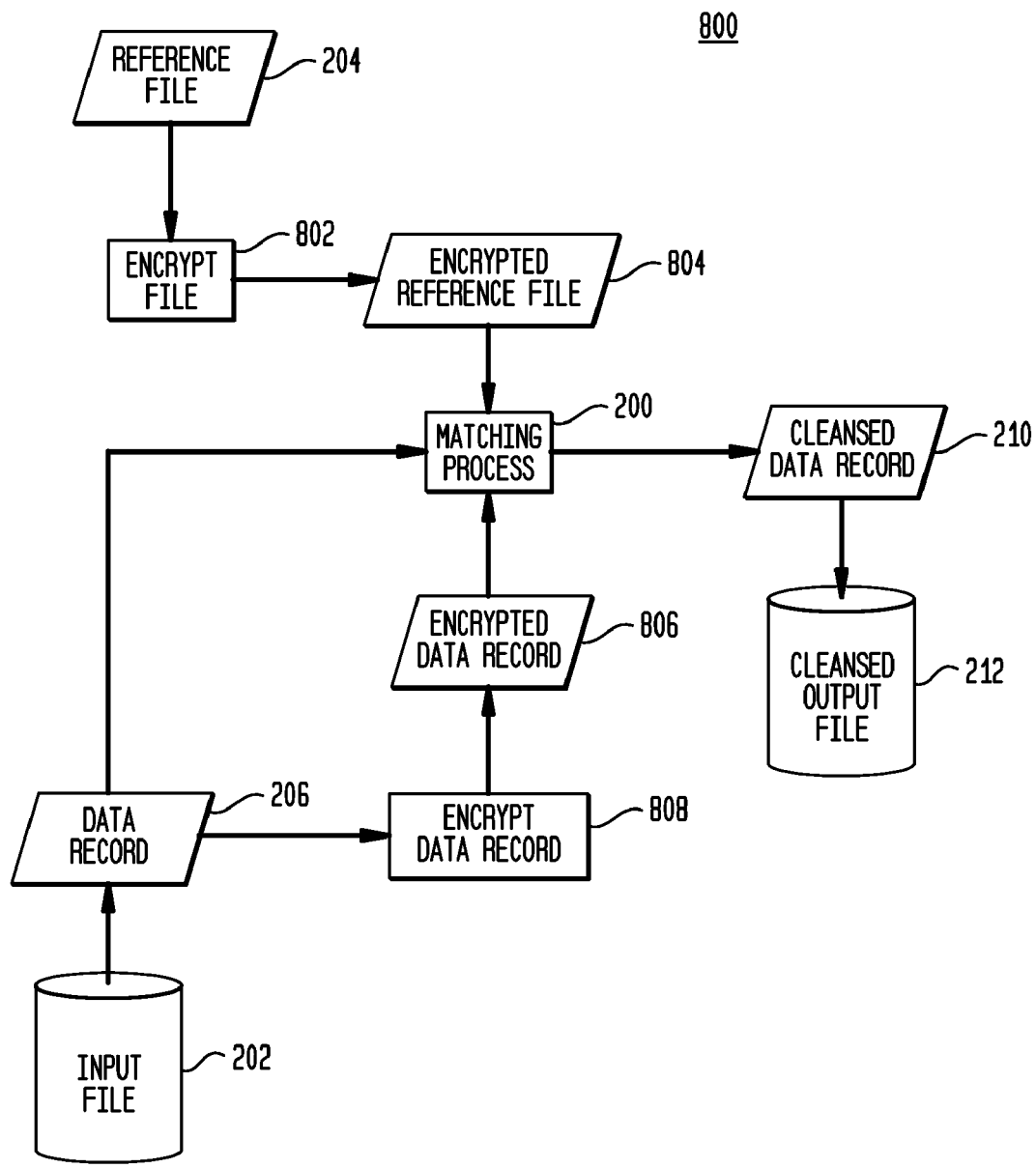
FIG. 8 is a block diagram showing the use of the process of the present invention by a customer.

As shown in FIG. 8, an owner or leaser of certain data creates one or more reference files 204 as discussed above and then optionally encrypts 802 the reference file 204 by conventional means for security purposes in order to prevent unwanted access by a customer. For each reference file 204 encrypted, the encryption process 802 generates an encrypted reference file 804. The encrypted reference file 804 has all sensitive data encrypted, except possibly the search key(s) 214, 602; however, even the search key(s) 214, 602 may be encrypted and used in encrypted form if desired. FIG. 8 is shown with one reference file 204 only, but this is for convenience. As also discussed above, the present invention may use any number of reference files 204. The owner of the encrypted reference file 804 sends the encrypted reference file 804 to a customer along with the software described above for accessing and manipulating the data records thereof according to the present invention described herein.

Using the software of the present invention, the customer loads the encrypted reference file(s) 804 and its own input file 202. The loaded software contains a matcher process, such as process 200 described above and all related functionality, which performs as described herein to match the data records 206 of an input file 202 against the one or more encrypted reference files 804. That is, the matcher 208 of the matching process 200 uses the provided search key(s) 214, 602 to obtain the candidate data record list for all matching data records contained in the encrypted reference file 804. Once a match is found by the matcher 208, the resulting cleansed data record 210 is written to the output file 212.

Alternatively, the owner of the encrypted reference file 804 and software of the present invention may decided to have none or a portion, e.g., name and address data or one or all of the search key(s) 214, 602, of the reference file 204 left unencrypted for speed and efficiency of use. In addition, the owner may have the software of the process 200 encrypt 806 the data record 206 of the input file 202 prior to being processed, thereby creating an encrypted data record 806. Thus, the matcher 208 of the process 200 compares the encrypted data record 806 to the encrypted data records of the encrypted reference file 804. This feature further ensures that a customer cannot access the software or the data records used by the software and files of the present invention. Again, once a match is found by the matcher 208 of the process, the resulting cleansed data record 210 is written to the output file 212.

Figure 9:
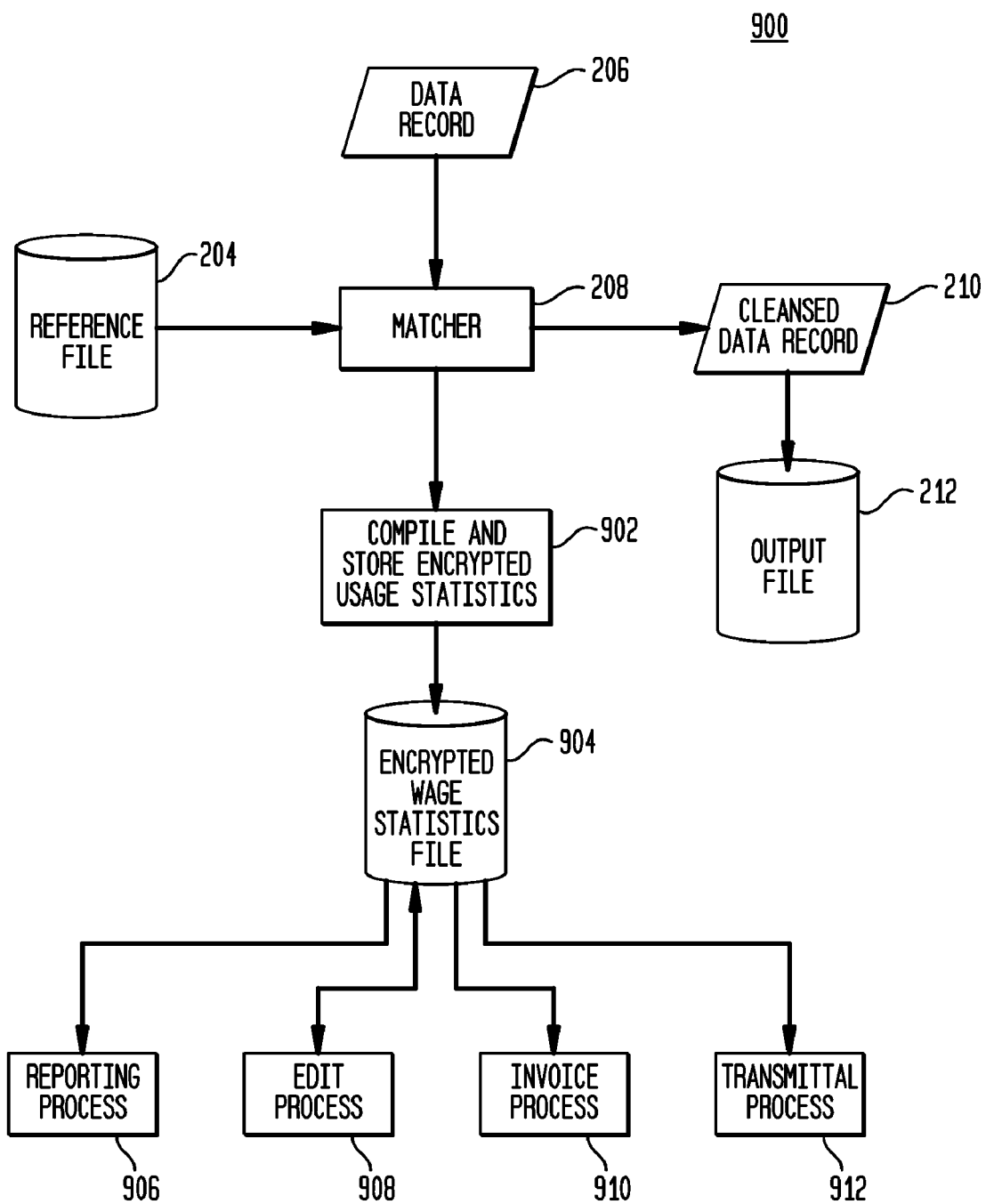
FIG. 9 is shown relating to how to provide secure reporting of usage of data records from a reference file by a customer.

Referring to FIG. 9, a high level structural diagram of a preferred embodiment of the present invention is shown relating to how to provide secure reporting, to both a customer and owner of the present invention, of usage of data records from a reference file 204 by a customer. In this process 900, a matcher 208, as described herein, compiles, stores, and encrypts 902 detailed usage information at the time of each match to an encrypted usage statistics file 904. Examples of possible usage information includes, but is not limited to, search key 214, 602 data values, field names and possible values of appended data, field names and data used to complete or correct values in an input file 202, data used for linking only, data used for summary reporting only, and what reference file(s) 204 and what input file 202 have been accessed and used.

Once the encrypted usage statistics file 904 is created, the present invention preferably offers four separate processes for accessing the detailed usage information contained therein. First, a reporting process 906 provides a means for generating, displaying and printing reports, e.g., month-to-date, detailing the usage of the reference file(s) 204. Second, an edit process 908 provides the means for editing the usage information contained in the encrypted usage statistics file 904 to correct the information about the statistics file owner and the type of usage. Where the type of usage is edited, a text explanation is preferably required. Also, such edits are optionally tracked for monitoring purposes. Third, at the end of a reporting period, e.g., monthly, an invoice process 910 produces an output performance invoice to allow the owner of the reference file(s) 204 and software of the present invention to bill the customer for the reference file(s) 204, and the data records contained therein, actually used by the customer. This invoice process 910 further provides various differing means of accounting for usage. For example, a customer may be billed a fixed fee amount per licensed reference file 204 or may be billed per access or match of a data record in a reference file 204. Various means are also taken to detect attempts by a customer to temporarily replace or corrupt the encrypted usage statistics file 902 in which usage data is recorded in order to avoid paying for such usage. Fourth, at each period end, e.g., monthly, a transmittal process 912 transmits a copy of the encrypted usage statistics file 902, typically via e-mail, to the owner(s) and vendor(s) of the licensed reference files 204 and software for analysis and reconciliation with the payment provided by the customer using the pro form a invoice.

Figure 10:
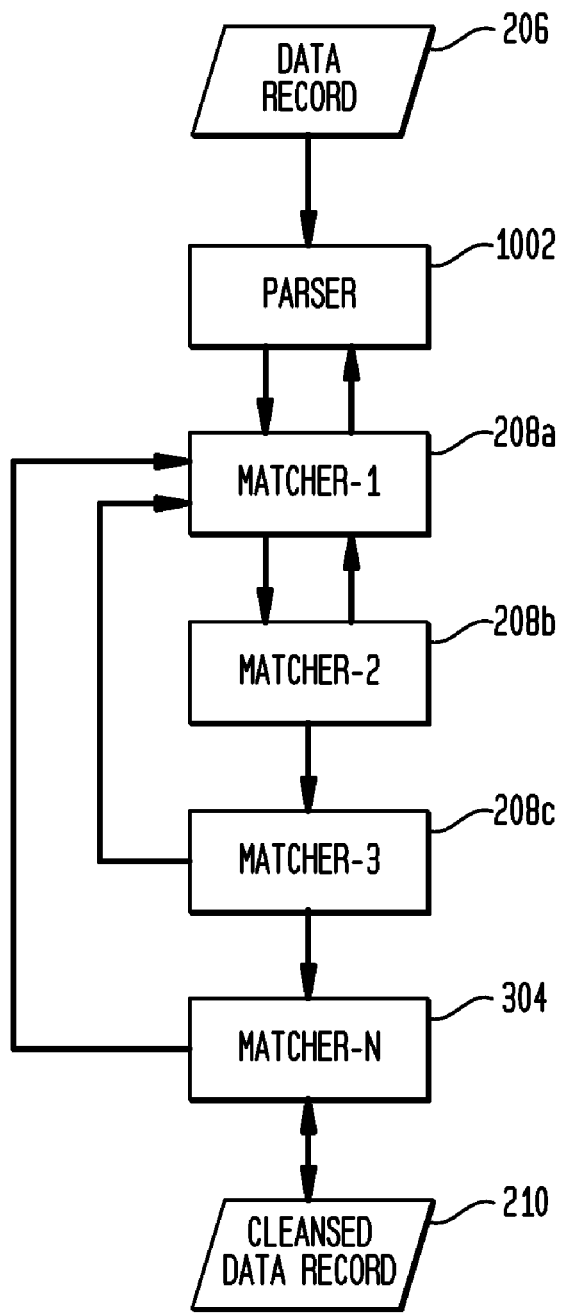
FIG. 10 is block diagram showing how to provide improved parsing and postal coding of addresses to a customer.

Referring to FIG. 10, a high level structural diagram of a preferred embodiment of the present invention is shown relating to how to provide improved parsing and postal coding of addresses to a customer. In this process 1000, a parser 1002 and one or more matchers 208 are used in combination to produce a cleansed data record 210. Also, this process 1000 is described in terms of the matcher-1 208a being a USPS Coding Accuracy Support System (CASS) certified process, whereas the remainder of the matchers 208, e.g., matcher-2 208b, matcher-3 208c and matcher-N 208d, are outside of the CASS certified process and are optional processes that may be used by the customer. As describe above, no matter how many matchers 208 are used by the present invention, the last matcher 208, e.g., matcher-N 208d, must be executed to reprocess any data record 206 where the address or business name has changed through the CASS process again. The USPS specifies the results that must be obtained and provides the reference files 204 (e.g., ZIP+4, City, State, Z4Change, etc.) that must be used, not the methodology that the vendor or owner must use.

In process 1000, a data record 206 of an input file 202 is passed to a parser 1002 to parse the address of the data record 206 into specified address elements required to match to the USPS provided reference files 204 and to parse the name contained in the data record 206, which may include business names, into a standardized form. The personal name is not required to be parsed for use by a USPS CASS process but will be required to be parsed along with the business name for use with other later matchers 208.

Parser 1002 passes the parsed record to matcher-1 208a which is the matcher 208 used as part of the USPS CASS process to match to the USPS provided reference files 204. The typical approach used in USPS CASS matchers is to match on ZIP code or on city and state. This requires that the Last Line Address Information have either a correct ZIP or city and state. It is not unusual for the ZIP code to be assigned wrong at some point, and get the associated wrong city and state. By use of search keys 214, 602 to search the ZIP+4 file for a matching data record in the reference file 204, which is not necessarily, as typical industry practice, Postal Finance Number, or ZIP, but rather constructed from data elements in the Delivery Line Address (House Number, House Number Suffix, Pre Directional, Street Name, Street Suffix, Street Post Directional, Unit Type, Unit Number), this problem can be addressed by identifying all the possible Delivery Line Addresses with a complete or partially complete Last Line data. These possible addresses can then be compared to the delivery line for a decision by matcher-1 208a. If there is a match to the existing Complete Delivery Line (City, State and ZIP) and at the customer's option there is no other matching delivery line with the same USPS Finance Number (indicating a ZIP code in the same general area), ZIP3, and there is no same city but in a different state then accept the data record 206 of the input file 202 last line. If there are multiple matches which can be resolved by matcher-2 208b, which is either DPV or DSF2 as specified by CASS rules, then the parsed data record is rechecked by matcher-1 208a. If there are not any multiple matches, the process 1000 proceeds to the rest of the matchers 208c, etc. If there are still multiple matches to the same Finance Number, ZIP3 or other states, then output record from the USPS CASS Certified Process using CASS rules, however flag the record for the type of multiple match (Finance Number, ZIP3 or Multiple state), and possibly retain the specifics. In matcher-3 208c (CCV), which is outside of the CASS process and a process which is client specified, check each of the possible matches starting with the CASS specified address and then in other Finance Numbers, ZIP3s and states to see where the named addressee matches and use that last line. The parsed data record is then reprocessed through matcher-1 208a. After this processing, the parsed data record then proceeds to the other matchers-N 208d, if any, or if no further matchers 208 remain, the resulting cleansed data record 210 is written to the Output File 212.

Figure 11:
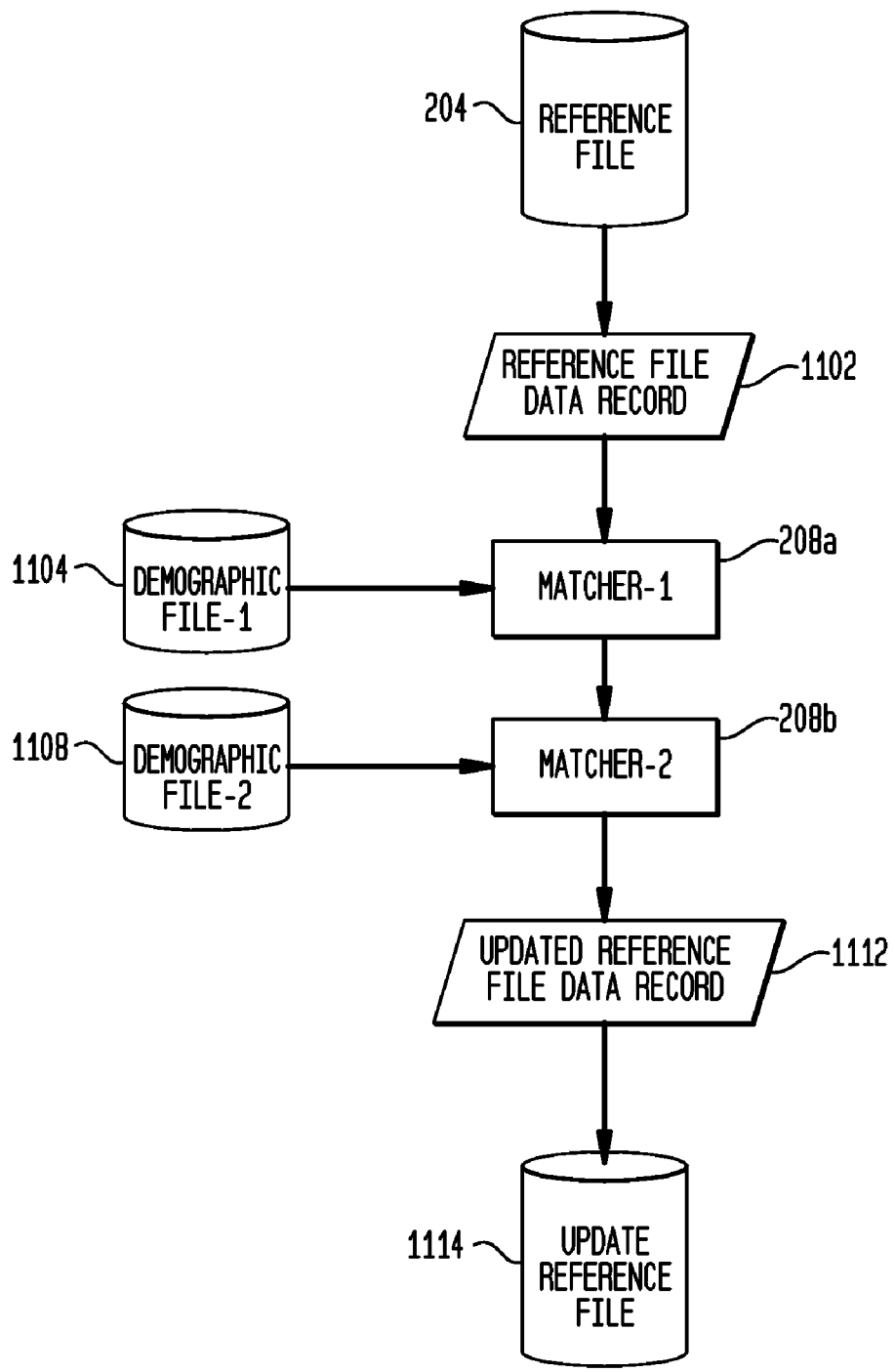
FIG. 11 is a block diagram of an embodiment illustrating modification of Change of Address (COA) Information.

Referring to FIG. 11, a high level structural diagram of a preferred embodiment of the present invention is shown relating to how a customer can provide and/or append COA history, such as old COA information (Old Address or DPC, or ZIP+4 or census Geocode, etc), to the data records 206 of an input file 202. In this process 1100, the reference file 204 that is to be updated with the new demographic information contained in a demographic file 1104, e.g., demographic file-1 1104, is read by a matcher 208, e.g., matcher-1 208a, in the same manner as an input file 202 described above. In one embodiment, the demographic file 1104 used by the matcher-1 208a preferably contains historic COA information, e.g., a COA reference file. Also as described above, the process 1100 may use multiple matchers 208, e.g., matcher-2 208b, as well as additional demographic files, e.g., demographic file-2 1106. Thus, each matcher 208 appends new demographic values to the reference file 204, thereby generating an updated reference file data record 1112 which is written to an updated reference file 1114 on remote storage. In the application of this process 1100 directed to a demographic file 1104 containing COA data records, the resulting updated reference file 1114 contains demographics for the time period relating to a move. The demographic files 1104, 116 may include US Census Demographics, demographic segmentation values, as well as, search keys 214, 602 to other individuals who lived at the prior and current addresses. By profiling the demographics over a period of time, a customer can determine the person or family's relative position in his/her life cycle. In addition, by tracking the persons with whom certain persons lived, a person's last name and his/her relationship can be imputed. Likewise, a female whose first and middle name remain the same, while the last name changes to, or changes to include, that of a male in the household, may be imputed to have married the male.

CONCLUSION

While various embodiments of the present invention have been described above, it should be understood that they have been presented by way of example only, and not limitation. It will be understood by those skilled in the art that various changes in form and details may be made therein without departing from the spirit and scope of the inventions as defined in the appended claims. Thus, the breath and scope of the present invention should not be limited by any of the above-described exemplary embodiments, but should be defined only in accordance with the following claims and their equivalents.

What is claimed is:

1. A method for creating a cleansed output file containing a plurality of business data records from a single pass through an input file, comprising the steps of:
    (a) selecting an input file containing a plurality of data records;
    (b) selecting a reference file, said reference file containing a plurality of data records;
    (c) computing a search key; and
    (d) for each said data record in said input file:
        (i) retrieving said data record from said input file on remote storage;
        (ii) searching said reference file with a matcher process for all said data records in said reference file that match said search key and reading each said data record from reference file that matches said search key, thereby generating a candidate data record list;
        (iii) searching said candidate data record list and determining a matching data record, wherein said matching data record matches said data record in said input file;
        (iv) creating a new cleansed data record;
        (v) cleansing said data record of said input file according to said matching data record, thereby generating verified information;
        (vi) writing said verified information into said new cleansed data record; and
        (vii) writing said new cleansed data record to a cleansed output file;
    wherein said steps (d)(i) through (d)(vii) are performed in a single pass through said data records of said input file and in a single pass through said reference file, such that each data record of said input file is read from a remote storage location only once, each said matching data record of said reference file is read from a remote storage location only once, and each said new data record to said cleansed output file is written to a remote storage location only once.

2. The method according to claim 1, further comprising two or more reference files and further comprising the step of:
    (e) repeating said step (d)(v) for said data record of said input file wherein said matcher cleanses said data record of said input file using said two or more reference files.

3. The method according to claim 2, further comprising two or more search keys, wherein said matcher process performs step (d)(ii) using each of said search keys.

4. The method according to claim 1, further comprising two or more reference files and two or more matcher processes, wherein each said matcher process access one of said two or more reference files and said data record of said input file resides in local memory while being processed by each of said matcher processes and each of said reference files.

5. The method according to claim 4, further comprising the step of:
    (e) recycling one said data record of said input file through one or more matcher processes while said data record of said input file resides in local memory, wherein said recycling processes said data record of said input file through one or more of said two or more reference files previously accessed.

6. The method according to claim 4, further comprising the steps of:
    (e) each said matcher process determining whether a subsequent matcher process should process said data record of said input file, wherein said determining results in no additional processing is performed on said data record of said input file, one or more said matcher processes are skipped, or a subsequent matcher process is changed.

7. The method according to claim 4, further comprising two or more search keys wherein each said matcher process accesses one said search key.

8. The method according to claim 4, wherein the method improves match rates for historic and "dirty data" address files, wherein one said reference file is constructed from the Federal Information Processing Standards (FIPS) Named Populated Places file, said search key indexes on place name and state, and said matcher process returns a ZIP Code from such index Named Populated Places reference file, further comprising:
    (e) matching using this ZIP where there was no ZIP Code present in the input record or the ZIP Code was different for the associated place name, or no match was obtained with the input record provided ZIP Code; comprising;
        i. inputting the original input ZIP Code to obtain a current ZIP Code;
        ii. inputting the original state and place name to obtain the current ZIP Code; or
        iii. proceeding with a matching process using the new ZIP Code obtained;
    (f) creating a second reference file constructed from the long term history of discontinued ZIPs and associated discontinued place names and the new ZIP Code and new place name;
    (g) indexing said second reference file on the state and place name and also on ZIP Code;
    (h) proceeding, if no match was found with the matching process using either of the following:
        (i) inputting the original input ZIP Code to obtain a current ZIP Code, or
        (ii) inputting the original state and place name to obtain the current ZIP Code; and
    (i) proceeding with a matching process using the new ZIP Code obtained.

9. The method according to claim 1, wherein said search key comprises: a predefined number of digits of the USPS ZIP+4 Code, a predefined number of digits representing an address number of a postal patron, a predefined number of alphanumeric characters representing a street name of the postal patron, and a predefined number of alphabetic characters representing the postal patron.

10. The method according to claim 1, wherein said reference file is organized such that two or more data records of said reference file that match a predefined search key are stored on remote storage in a primary physical block of memory, such that said matcher process reads said candidate data record list in said step (d)(ii) with a single memory read command.

11. The method according to claim 10, wherein said reference file is organized such that two or more data records of said reference file that match said search key are stored on remote storage in a primary physical block and an overflow physical block of memory, such that said matcher process reads said candidate data record list in said step (d)(ii) with two memory read commands.

12. The method according to claim 1, wherein said determining said matching record by said matcher process of said step (d)(iii), comprises the steps of:
(1) for each data field in said search key, determining a degree of match between said data record of said input file and a data record of said reference file in said candidate data record list, said degree of similarity ranging in value from an identical value to no identifiable similarity;
(2) arranging said degree of match determined in said step (d)(iii)(1) in a table;
(3) determining whether each row of table in said step (d)(iii)(2) represents a match or no match of said data record of said input file and said data record of said candidate data record list; and
(4) establishing for each row of said table in said step (d)(iii)(2) a match or no-match value.

13. The method according to claim 1, wherein said data records of said input file contain a mixture of personal and business data records, said business records containing one or more contact names and addresses, and said search key containing data elements selected from the group consisting of personal name and demographical information.

14. The method according to claim 1, wherein in said step (d)(iii) said matcher process matches a female's maiden name to her married name, comprising the steps of:
(1) matching a confirming piece of information, such as all or part of the: Social Security Number (SSN), Date or Birth (DOB), Driver's License State and Number, Phone Number, USPS Delivery Point Code, or other identifying information of the female in said matching data record and said data record of said input file, or matching a first name and at least a middle initial in said matching data record and said data record of said input file;
(2) matching a portion of a last name in said matching data record and said data record of said input file; and
(3) confirming that the gender of the female is selected from the group consisting of female, indeterminate, or blank.

15. The method according to claim 1, further comprising the steps of:
(e) generating a unique front door key for a front door of an address wherein said unique front door key comprises a USPS ZIP+4 Code+a predefined number of digits of a house number and a predefined number of characters of a unit number;
(f) assigning said unique front door key to said cleansed data record of said output file; and
(g) maintaining a reference database that correlates all new DPC assignments for an address to said unique front door key.

16. The method according to claim 1, wherein the method provides data to a third party with associated software to allow use of the provided data, without allowing the third party direct access to the data in clear text form, wherein said reference database is un-encrypted and said method further comprises:
(e) a means for encrypting said reference file and extracting a key to allow aggregating records to be considered for match between said input file and said reference database;
(f) a means for encrypting said input file and extracting said key for said reference database;
(g) a means for comparing said encrypted input file against said encrypted reference file, and if there is an acceptable match in encrypted form to cause said encrypted reference data record to be unencrypted, and the required data from said reference file be appended to said data record of said input file; and
(h) reporting the data content used for royalty reporting purposes.

17. The method according to claim 16, wherein the method prevents the third party which has been provided said encrypted reference file and associated software for use of said encrypted reference file from modifying usage reporting of said encrypted reference file without detection of such modifications.

18. The method of claim 1, wherein said method provides USPS postal coding without depending on the ZIP Code or Last Line City and State Abbreviation to be correct, comprising the steps of
(e) wherein said reference file contains USPS ZIP+4 data, indexing said reference file on:
(i) Delivery Point Code (DPC);
(ii) Five Digit ZIP Code+Right most N (such as five) characters of House Number+First M (such as three) characters of street name;
(iii) House number+SOUNDEX street name (without prefixes and suffixes)+unit number (if any)+Street PreDirectional (if any)+Street Post Directional (if any)+Street Type (if any); and
(iv) State+City Name;
wherein said matcher process comprises a means to retrieve on any of the available keys using information from an input record and then to match, using an available matching tool that input record to the base record to then assign the postal codes and parsed address text, and a means for appending a footnote code to each input record that describes the degree of match to each data field of the input record.

19. The method according to claim 1, the plurality of business data records are selected from a group consisting of: contact information, address information, demographic information, business information, and shipping information.

* * * * *